United States Patent
Maeda et al.

(10) Patent No.: US 11,001,281 B2
(45) Date of Patent: May 11, 2021

(54) TRAIN COMMUNICATION SYSTEM

(71) Applicant: Panasonic Intellectual Property Management Co., Ltd., Osaka (JP)

(72) Inventors: Takuji Maeda, Osaka (JP); Nobuhiko Arashin, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 289 days.

(21) Appl. No.: 16/140,814

(22) Filed: Sep. 25, 2018

(65) Prior Publication Data

US 2019/0023294 A1 Jan. 24, 2019

Related U.S. Application Data

(63) Continuation of application No. PCT/JP2017/009414, filed on Mar. 9, 2017.

(30) Foreign Application Priority Data

Apr. 1, 2016 (JP) .............................. JP2016-074638

(51) Int. Cl.
*B61L 15/00* (2006.01)
*H04W 84/20* (2009.01)
(Continued)

(52) U.S. Cl.
CPC .......... *B61L 15/0027* (2013.01); *B60L 15/42* (2013.01); *B61L 15/0081* (2013.01); *H04W 4/42* (2018.02);
(Continued)

(58) Field of Classification Search
CPC ... B61L 15/00; B61L 15/0018; B61L 15/0027
See application file for complete search history.

(56) References Cited

U.S. PATENT DOCUMENTS 5,720,455 A * 2/1998 Kull .................... B60L 15/32
246/187 C
5,867,801 A * 2/1999 Denny .................... B61L 3/125
246/169 R
(Continued)

FOREIGN PATENT DOCUMENTS

JP 2001-138916 5/2001
JP 2012-004863 1/2012

OTHER PUBLICATIONS

Extended European Search Report dated Mar. 21, 2019 in corresponding European Patent Application No. 17774160.0.

*Primary Examiner* — Robert J McCarry, Jr.
(74) *Attorney, Agent, or Firm* — Wenderoth, Lind & Ponack, L.L.P.

(57) ABSTRACT

A train communication system is configured to perform wireless communication between two cars coupled to each other by using low power radio. The train communication system includes: a first device disposed on one coupling surface of two coupling surfaces facing each other between two cars; a second device disposed on the one coupling surface; a third device disposed on another coupling surface of the two coupling surfaces; and a fourth device disposed on the other coupling surface. The first device and the third device are disposed to face each other. The second device and the fourth device are disposed to face each other. When no wireless connections are established among the first device, the second device, the third device, and the fourth device, the first to fourth devices each perform at least one of switching of communication channels used for wireless communication among the first to fourth devices and switching of a master device or a slave device.

10 Claims, 16 Drawing Sheets

(51) Int. Cl.
*H04W 72/04* (2009.01)
*H04W 4/48* (2018.01)
*B60L 15/42* (2006.01)
*H04W 4/42* (2018.01)

(52) U.S. Cl.
CPC ............ *H04W 4/48* (2018.02); *H04W 72/04* (2013.01); *H04W 72/0453* (2013.01); *H04W 84/20* (2013.01); *Y02D 30/70* (2020.08); *Y02T 90/16* (2013.01)

(56) References Cited

U.S. PATENT DOCUMENTS

| | | | |
|---|---|---|---|
| 6,782,044 B1 * | 8/2004 | Wright | B61L 15/0027 375/224 |
| 8,185,264 B2 * | 5/2012 | Carroll | B61L 15/0027 701/19 |
| 2002/0030590 A1 * | 3/2002 | Dieckmann | B60D 1/62 340/431 |

* cited by examiner

TRAIN COMMUNICATION SYSTEM

TECHNICAL FIELD

The present disclosure relates to a train communication system configured to perform communication between two cars coupled to each other by using low power radio.

BACKGROUND ART

PTL 1 discloses an inter-vehicle communication system for trains using multi-route wireless communication for communication between cars.

CITATION LIST

Patent Literature

PTL 1: Unexamined Japanese Patent Publication No. 2012-4863

SUMMARY OF THE INVENTION

The present disclosure provides a train communication system capable of establishing an adequate wireless connection.

The train communication system of the present disclosure relates to a train communication system configured to perform wireless communication between two cars coupled to each other by using low power radio. The train communication system includes: a first device disposed on one coupling surface of two coupling surfaces facing each other between two cars; a second device disposed on the one coupling surface; a third device disposed on another coupling surface of the two coupling surfaces; and a fourth device disposed on the other coupling surface. The first device and the third device are disposed to face each other. The second device and the fourth device are disposed to face each other. When no wireless connections are established among the first device, the second device, the third device, and the fourth device, the first to fourth devices each perform at least one of switching of communication channels used for wireless communication among the first to fourth devices and switching of a master device or a slave device.

DESCRIPTION OF EMBODIMENTS

Hereinafter, exemplary embodiments will be described in detail with reference to the drawings as appropriate. However, an unnecessarily detailed description will be omitted in some cases. For example, a detailed description of a well-known matter and a duplicated description of substantially the same configuration will be omitted in some cases. This is to avoid unnecessary redundancy in the following description and to facilitate understanding by those skilled in the art.

Note that the present inventor will provide the accompanying drawings and the following description for those skilled in the art to sufficiently understand the present disclosure, and does not intend to limit the subject matter described in the claims.

First Exemplary Embodiment

A first exemplary embodiment will now be described with reference to FIGS. 1 to 6.

[1-1. Configuration]

A train communication system is a communication system configured to perform communication between cars including two or more cars coupled to each other.

Figure 1A:
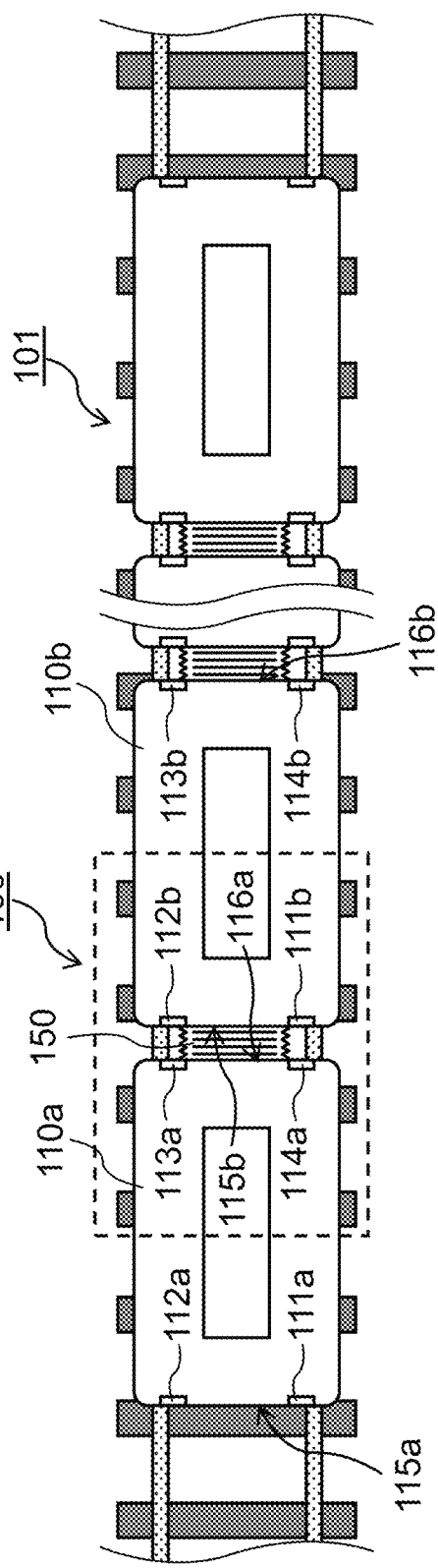
FIG. 1A is a schematic diagram illustrating an outline of a train communication system according to a first exemplary embodiment.
Figure 1B:
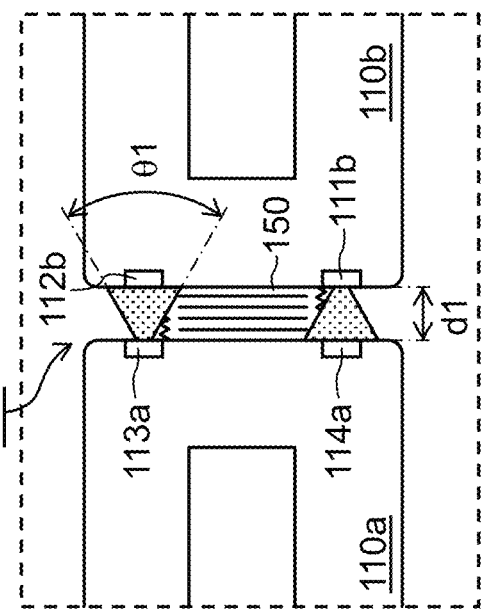
FIG. 1B is an enlarged view illustrating a portion surrounded by a broken line in FIG. 1A in an enlarged scale.

FIG. 1A is a schematic diagram illustrating an outline of a train communication system according to a first exemplary embodiment. FIG. 1A illustrates the train communication system viewed entirely from above. FIG. 1B is an enlarged view illustrating a portion surrounded by a broken line in FIG. 1A in an enlarged scale. In the following description, first master devices 111a, 111b are used as examples of a first device, first slave devices 112a, 112b are used as examples of a second device, second master devices 113a, 113b are used as examples of a third device, and second slave devices 114a, 114b are used as examples of a fourth device.

As illustrated in FIG. 1A, train communication system 100 is provided on train 101 including two or more cars 110a, 110b, . . . coupled to each other. As used herein the term "two or more cars 110a, 110b" is intended to include precedent cars and following cars. In FIG. 1A, car 110a is at the frontmost position, and thus car 110a is referred to as a leading car. Car 110b coupled to a rear side of car 110a is referred to as a following car. Train communication system 100 includes first master devices 111a, 111b, . . . , first slave devices 112a, 112b, . . . , second master devices 113a, 113b, . . . , and second slave devices 114a, 114b, . . . .

Since configurations of cars 110a, 110b, . . . are similar to each other, only car 110a will be basically described below. The configuration of car 110b may be described in the same manner by replacing the postfix "a" by "b" of reference signs allocated to components of car 110a.

Car 110a includes first master device 111a, first slave device 112a, second master device 113a, and second slave device 114a.

More specifically, first master device 111a and first slave device 112a are disposed on coupling surface 115a located on a front end side of car 110a. First master device 111a and first slave device 112a may be supported by a predetermined supporting member disposed on coupling surface 115a on a front end side of car 110a.

Second master device 113a and second slave device 114a are disposed on coupling surface 116a on a rear end side of car 110a. Second master device 113a and second slave device 114a may be supported by a predetermined supporting member disposed on coupling surface 116a on a rear end side of car 110a.

Coupling surfaces 115a, 116a are surfaces facing forward or rearward of car 110a, and are surfaces facing coupling surfaces of other cars when car 110a is coupled to other cars. Coupling surfaces 115a, 116a may be a flat surface or a curved surface.

First master device 111a and second master device 113a each operate as a master device. First slave device 112a and second slave device 114a each operate as a slave device. In other words, each of first master device 111a and second master device 113a is wirelessly connected to a device that operates as a slave device. Likewise, each of first slave device 112a and second slave device 114a is wirelessly connected to a device that operates as a master device.

Each of devices 111a to 114a is implemented, for example, by a processor, a memory, and an antenna, although not illustrated. Each of devices 111a to 114a is operated as a master device or a slave device by a processor executing a program stored in a memory in advance. Note that each of devices 111a to 114a may be operated as a master device or a slave device by a specific circuit instead of the processor and the memory. In other words, operation of each of devices 111a to 114a may be achieved by software and may be achieved by hardware.

Each of devices 111a to 114a performs wireless communication with a device wirelessly connected by using a low power radio. A communication distance of a low power radio in the present exemplary embodiment is set to a distance that cannot achieve a wireless connection with a device provided on the same car on an opposite side, and with a device provided on a farther side of a next car coupled to the car where each device is disposed. For example, as illustrated in FIG. 1B, car 110a and car 110b are coupled by coupler 150 at predetermined distance d1 (for example, 0.5 m to 1 m). Therefore, a communication distance of low power radio may be at least predetermined distance d1 or larger, and smaller than a length of the car in a fore-and-aft direction. The configuration described above reduces an erroneous connection with the device provided on the same car on the opposite side and with the device provided on a far side of the next car coupled to the car where the device is provided.

As illustrated in FIG. 1B, a transmission/reception directivity angle range of the low power radio (radio emitted from second master device 113a) is a predetermined angle $\theta 1$ (for example, 60 degrees). Although not illustrated, a transmission/reception directivity angle range of other master devices including first master device 111b is also the predetermined angle $\theta 1$ in the same manner as second master device 113a. Therefore, erroneous connection with the devices provided on other cars traveling on an adjacent railroad may be reduced.

For example, the wireless communication with low power radio is wireless communication using a radio wave in a millimeter waveband, and is wireless communication defined by IEEE802.11ad standard (WiGig (registered trademark)). WiGig includes four different channels CH1 to CH4. In the present exemplary embodiment, a case of using two channels CH2, CH3 of four channels CH1 to CH4 will be described. Note that the wireless communication with low power radio is also implemented by, for example, Wi-Fi (registered trademark) whose radio wave strength has been lowered. However, Wi-Fi (registered trademark) provides hot spots at various places such as stations, and is used by various devices such as smartphone, and tablet terminals, laptop PCs. Therefore, it is preferable to use WiGig (registered trademark) having less probability of erroneous connection than Wi-Fi (registered trademark).

The communication channel may be divided into a plurality of channels by differentiating a frequency band as described above, or may be divided into a plurality of channels by differentiating a direction of oscillation of a polarized wave. When the channel is divided into a plurality of channels based on the polarized wave, for example, the communication channel may be switched by using an antenna for a horizontal polarized wave and an antenna for a vertical polarized wave to switch the antenna to be used for wireless communication.

First master device 111a and second master device 113a are disposed to be aligned on a diagonal line when car 110a is viewed from above. In the same manner, first slave device 112a and second slave device 114a may be disposed to be aligned on a diagonal line different from a diagonal line connecting the master devices when car 110a is viewed from above. In other words, first master device 111a and a first slave device 112a are disposed at positions different in the horizontal direction (different positions at the same height from the ground), and second master device 113a and second slave device 114a are disposed at positions different in the horizontal direction (different positions at the same height from the ground).

More specifically, first master device 111a and first slave device 112a are arranged at positions at an equal distance from center of car 110a in the horizontal direction at different positions on the left and the right with respect to the center when viewed from the front of car 110a. In other words, when viewed from above, an intermediate point of a segment connecting positions of first master device 111a and first slave device 112a passes a center of car 110a in the horizontal direction.

In the same manner, second master device 113a and second slave device 114a are arranged at positions at an equal distance from center of car 110a in the horizontal direction at different positions on the left and the right with respect to the center when viewed from the front of car 110a. In other words, when viewed from above, an intermediate point of a segment connecting positions passes a center of car 110a in the horizontal direction. The segment is a line connecting positions where second master device 113a and second slave device 114a are disposed.

When viewed from the front of car 110a, when first master device 111a is disposed on the right (left) with respect to the center of car 110a in the horizontal direction, the position of second master device 113a with respect to the center is right (left) when viewed from the rear of car 110a. In other words, a left and right positional relationship of first master device 111a with respect to the center of car 110a in the horizontal direction when viewed from the front of car 110a is identical to a left and right positional relationship of second master device 113a with respect to the center of car 110a in the horizontal direction when viewed from the rear of car 110a.

In the same manner, when viewed from the front of car 110a, when first slave device 112a is disposed on the right (left) with respect to the center of car 110a in the horizontal direction, the position of second slave device 114a with respect to the center is right (left) when viewed from the rear of car 110a. In other words, a left and right positional relationship of first slave device 112a with respect to the center of car 110a in the horizontal direction when viewed from the front of car 110a is identical to a left and right positional relationship of second slave device 114a with respect to the center of car 110a in the horizontal direction when viewed from the rear of car 110a.

Accordingly, when two cars are to be coupled, even when one car is coupled to the other car in a state in which the front and rear of the one car are reversed, a master device disposed on the one car and a slave device disposed on the other car can face each other.

Specifically, as illustrated in FIG. 1B, between two cars; car 110a and car 110b coupled to each other, second master device 113a disposed on coupling surface 116a on the rear end side of car 110a and first slave device 112b disposed on coupling surface 115b on the front end side of car 110b face each other. Likewise, between car 110a and car 110b, second slave device 114a disposed on coupling surface 116a on the rear end side of car 110a and first master device 111b disposed on coupling surface 115b on the front end side of car 110b face each other.

Figure 2:
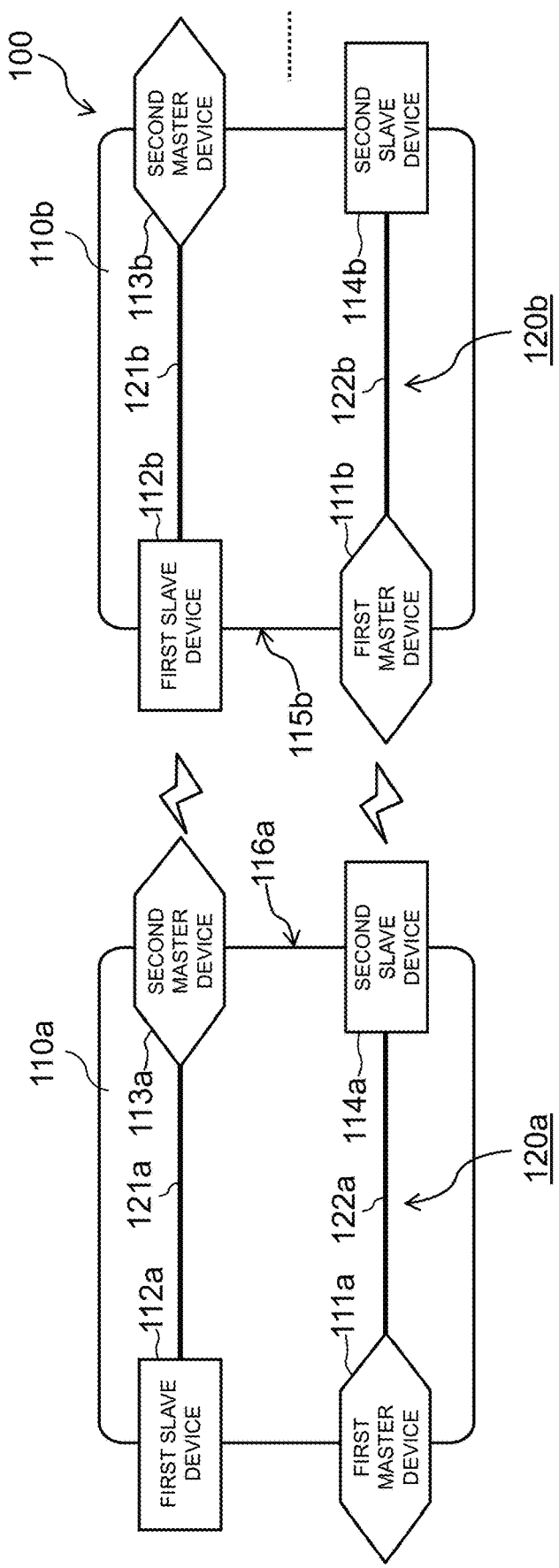
FIG. 2 is a block diagram illustrating an example of a configuration of the train communication system according to the first exemplary embodiment.

FIG. 2 is a block diagram illustrating an example of a configuration of the train communication system according to the first exemplary embodiment.

As illustrated in FIG. 2, on-board network 120a configured in car 110a has two communication routes; first on-board network 121a and second on-board network 122a. Specifically, first on-board network 121a is established by a wired connection between first slave device 112a and second master device 113a. Likewise, second on-board network 122a is established by a wired connection between first master device 111a and second slave device 114a.

When car 110a and car 110b configured in this manner are coupled to each other, second master device 113a and first slave device 112b are wirelessly connected to each other and second slave device 114a and first master device 111b are wirelessly connected to each other. Therefore, two communication routes are formed also in entire train communication system 100 composed of a plurality of cars 110a, 110b, . . . coupling to each other.

Figure 3:
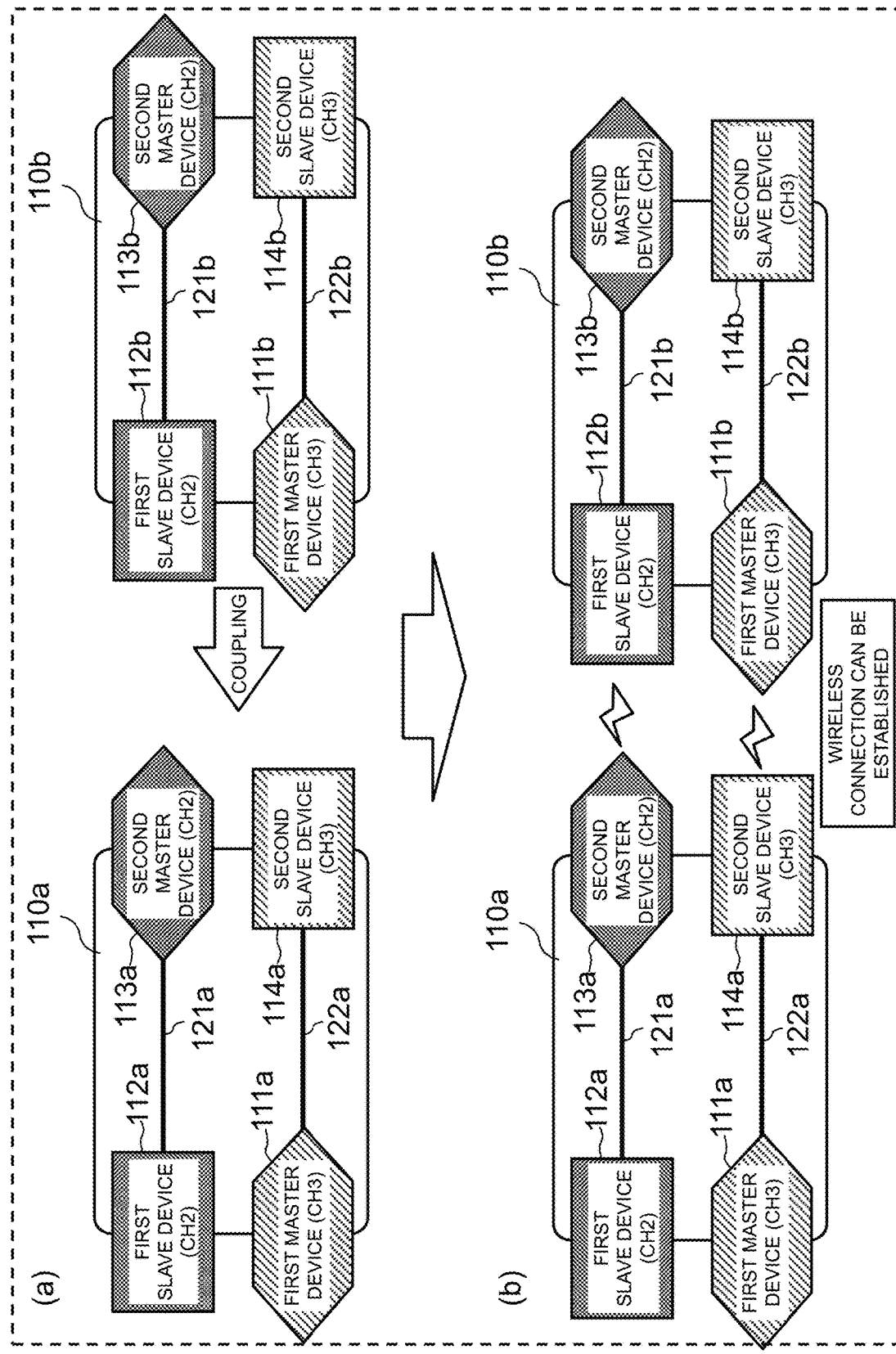
FIG. 3 is an explanatory diagram illustrating problems developed when two cars decoupled from each other are brought closer to each other.
Figure 4:
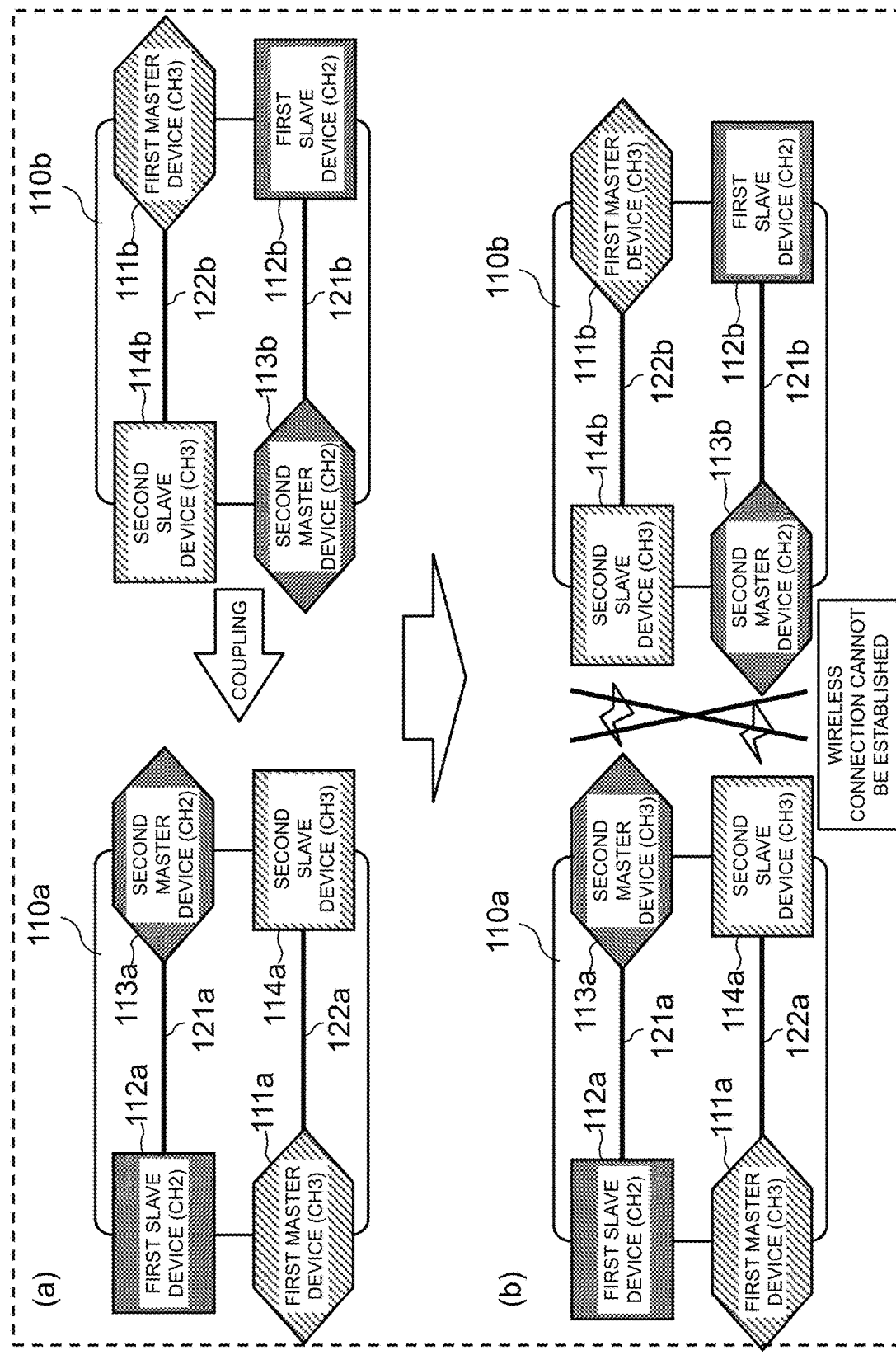
FIG. 4 is an explanatory diagram illustrating problems developed when the two cars decoupled from each other are brought closer to each other.

FIGS. 3 and 4 are explanatory diagrams each illustrating problems developed when the two cars decoupled from each other are brought closer to each other.

As illustrated in FIG. 3, different communication channels are used in the two communication routes in train communication system 100. For example, in first on-board network 121a, wireless communication is performed by using channel CH2, while in second on-board network 122a, wireless communication is performed by using channel CH3. In other words, one of first master device 111a and first slave device 112a performs wireless communication by using a communication channel different from a communication channel used by the other one of first master device 111a and first slave device 112a for wireless communication. Likewise, one of second master device 113a and second slave device 114a performs wireless communication by using a communication channel different from a communication channel used by the other one of second master device 113a and second slave device 114a for wireless communication.

Now, a situation will be considered that car 110b is brought closer to car 110a from a state in which car 110a and car 110b are decoupled and not wirelessly connected to each other.

In an example illustrated in FIG. 3, when car 110a and car 110b are brought closer to each other, communication channels used for a wireless connection between second master device 113a and first slave device 112b are identical channels CH2, second master device 113a and first slave device 112b being positioned to face each other. In the same manner, communication channels used for a wireless connection between second slave device 114a and first master device 111b are identical channels CH3, second slave device 114a and first master device 111b being positioned to face each other. Therefore, as illustrated in part (b) of FIG. 3, channel CH2 establishes a wireless connection between second master device 113a and first slave device 112b, and channel CH3 establishes a wireless connection between second slave device 114a and first master device 111b.

In contrast, in an example illustrated in FIG. 4, when car 110a and car 110b are brought closer to each other, communication channels used for a wireless connection between second master device 113a and second slave device 114b are channels CH2 and CH3 different from each other, second master device 113a and second slave device 114b being positioned to face each other. In the same manner, communication channels used for a wireless connection between second slave device 114a and second master device 113b are channels CH3 and CH2 different from each other, the second slave device 114a and second master device 113b being positioned to face each other. In other words, the example in FIG. 4 is a case where an attempt is made to couple car 110b to car 110a in a state in which the front and rear of car 110b are reversed from a state of the example in FIG. 3.

In this manner, when the front and rear of one car 110b are reversed, a master-and-slave relationship between devices positioned to face each other is maintained, but communication channels used for the wireless connection are different from each other. Therefore, the wireless connection cannot be achieved if no measures are taken.

Therefore, even when an attempt is made to couple one car 110b to the other car 110a with the front and rear of one car 110b reversed, control for establishing a wireless connection between devices facing each other needs to be performed. In the present exemplary embodiment, when no wireless connections are established among first master device 111a, second master device 113a, first slave device 112a, and second slave device 114a, first master device 111a, second master device 113a, first slave device 112a and second slave device 114a respectively switch the communication channels to be used for establishing wireless communication between the devices. In other words, when the communication channels of the devices facing each other are different after the front and rear of one car 110b are reversed, the devices each switch the communication channels to communication channels to be used for wireless communication to establish a wireless connection.

When no wireless connection is established between first master device 111a and first slave device 112a, first master device 111a and first slave device 112a may simultaneously switch communication channels used for communications between first master device 111a and first slave device 112a. In the same manner, when no wireless connection is established between second master device 113a and second slave device 114a, second master device 113a and second slave device 114a may simultaneously switch communication channels to be used respectively by second master device 113a and second slave device 114a in wireless communication.

In other words, communication channels of the devices disposed on the front end (left side in FIG. 4) of car 110a are switched simultaneously and communication channels of the devices disposed on a rear end of car 110a are switched simultaneously. Accordingly, the devices disposed on the front end or the devices disposed on the rear end (right side in FIG. 4) are prevented from being switched to the same communication channel. Consequently, establishing a wireless connection are prevented or reduced between the devices disposed on the front end or between the devices disposed on the rear end.

[1-2. Operation]

A description will be given below of an operation of train communication system 100 configured as described above. Train communication system 100 of the present exemplary embodiment is operated by switching a mode between a normal mode and a channel switching mode.

Figure 5:
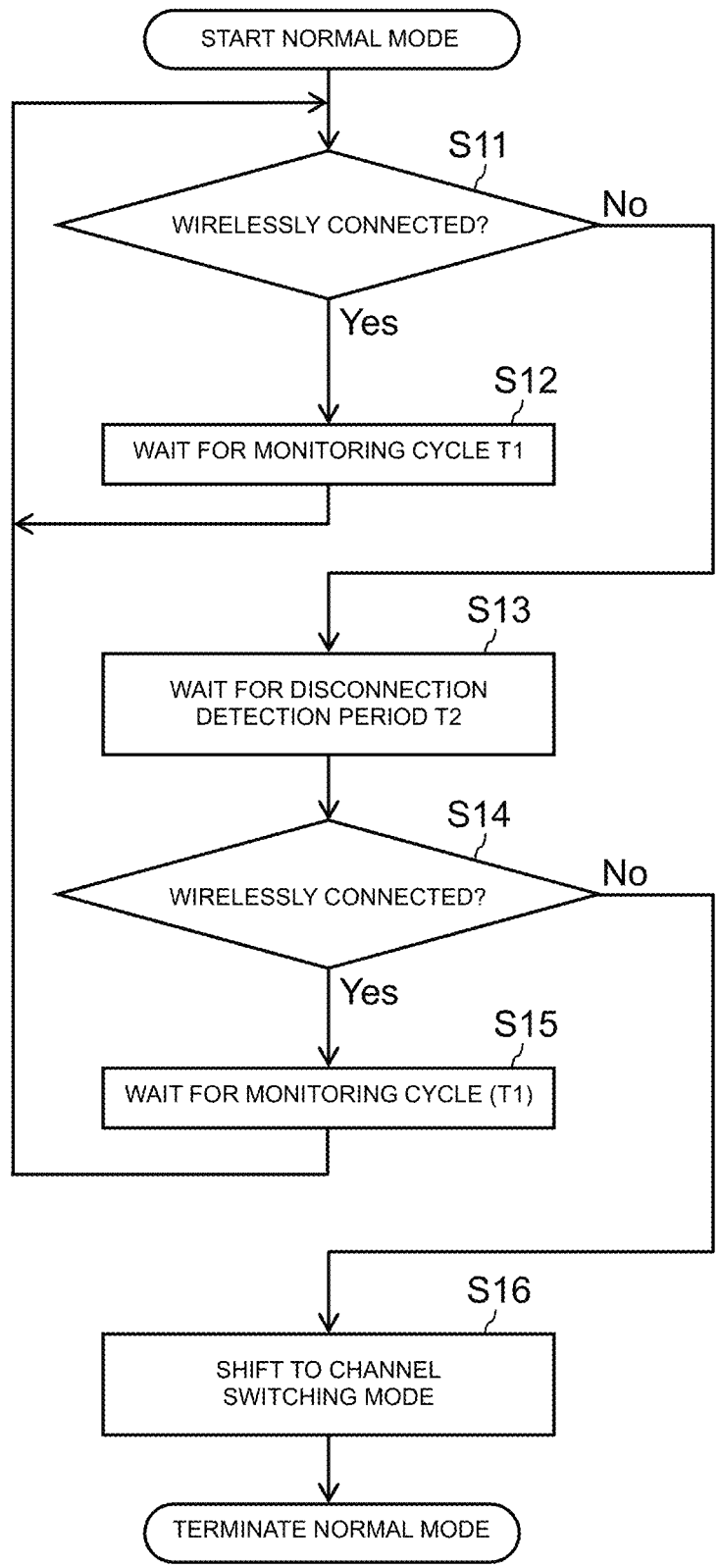
FIG. 5 is a flowchart illustrating an operation when each device according to the first exemplary embodiment is in a normal mode.
Figure 6:
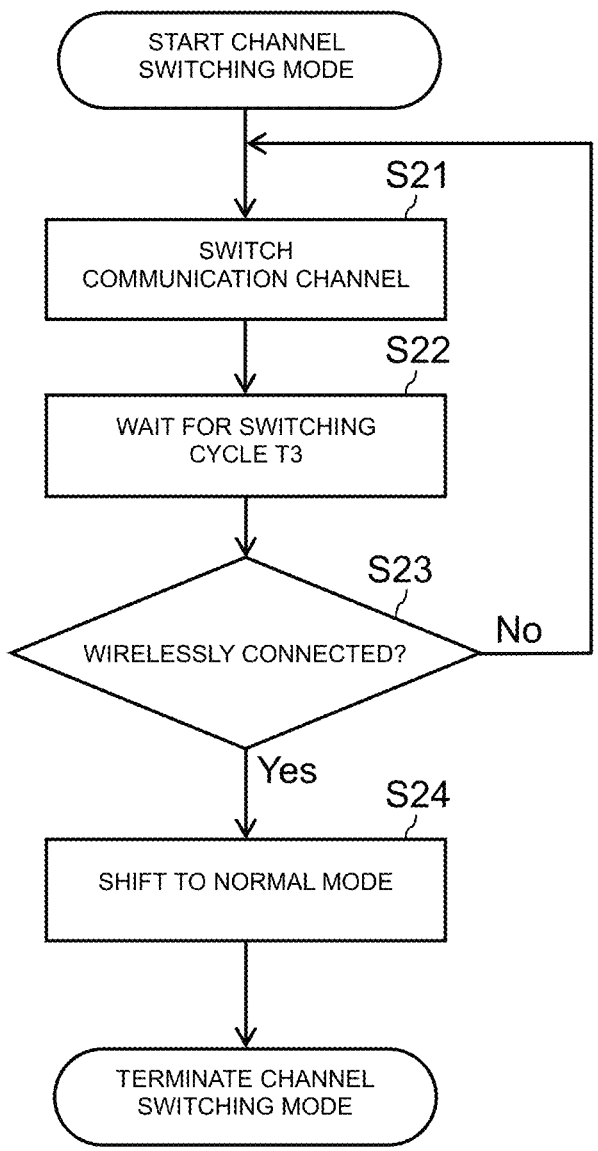
FIG. 6 is a flowchart illustrating an operation when each device according to the first exemplary embodiment is in a channel switching mode.

FIG. 5 is a flowchart illustrating an operation when each device according to the first exemplary embodiment is in the normal mode. FIG. 6 is a flowchart illustrating an operation when each device according to the first exemplary embodiment is in a channel switching mode.

In train communication system 100 of the present exemplary embodiment, each of first master devices 111a, 111b, . . . , first slave devices 112a, 112b, . . . , second master devices 113a, 113b, . . . , and second slave devices 114a, 114b, . . . operates independently. Therefore, only an operation of second master device 113a will be described below. The similar operation is performed also in other devices.

The normal mode will be described with reference to FIG. 5.

In the normal mode, whether second master device 113a is wirelessly connected or not is determined (step S11).

When second master device 113a is determined to be wirelessly connected (Yes in step S11), second master device 113a waits for a period of monitoring cycle T1 (step S12) and repeats step S11. Monitoring cycle T1 is, for example, a period ranging from several hundred milliseconds to several seconds.

On the other hand, when second master device 113a is determined not to be wirelessly connected (No in step S11), second master device 113a wait for disconnection detection period T2 (step S13). Disconnection detection period T2 is, for example, a period ranging from several hundred milliseconds to several seconds.

Then, whether second master device 113a is wirelessly connected or not is determined again (step S14).

When second master device 113a is determined to be wirelessly connected (Yes in step S14), second master device 113a waits for a period of monitoring cycle T1 (step S15) and returns to step S11.

In this manner, a second determination of whether second master device 113a is wirelessly connected or not is performed in step S14 to exclude a state in which wireless connection is intercepted temporarily for some reason and then is connected again in a first determination (step S11). In other words, the second determination of whether second master device 113a is wirelessly connected or not is performed to exclude a state other than the state in which the wireless connection is continuously intercepted. The number of times of determination may be three times or more.

On the other hand, when second master device 113a is determined not to be wirelessly connected (No in step S14), second master device 113a shifts to the channel switching mode (step S16) and terminates the normal mode.

For example, in the case of part (b) in FIG. 4, second master device 113a cannot establish a wireless connection because the communication channel of second master device 113a is different from that of second slave device 114b facing second master device 113a. Therefore, results of the first determination of wireless connection (step S11) and the second determination of wireless connection (step S14) are "No". Therefore, in this case, second master device 113a shifts from the normal mode to the channel switching mode (step S16).

Referring now to FIG. 6, the channel switching mode will be described below.

In the channel switching mode, second master device 113a switches the communication channel from a current communication channel to another communication channel (step S21). Second master device 113a switches the channel from channel CH2 to channel CH3 in the case illustrated in part (b) in FIG. 4.

Second master device 113a then waits for a switching cycle T3 (step S22). The switching cycle T3 is a randomly different period. The switching cycle T3 may be, for example, a period obtained by adding a randomly selected period ranging from 1 second to 5 seconds to 10 seconds (for example, 11 seconds to 15 seconds).

Then, whether second master device 113a is wirelessly connected or not is determined (step S23).

When second master device 113a is determined to be wirelessly connected (Yes in step S23), second master device 113a shifts to the normal mode (step S24) and terminates the channel switching mode.

On the other hand, when second master device 113a is determined not to be wirelessly connected (No in step S23), second master device 113a returns to step S21 and switches the communication channel again. In other words, second master device 113a switches the communication channel periodically when no wireless connection is established.

The switching cycle T3 of the communication channel is a randomly set period.

[1-3. Effect and Other Benefits]

As described thus far, in the present exemplary embodiment, train communication system 100 is a system for performing wireless communication between two cars 110a, 110b coupled to each other by using low power radio. Train communication system 100 includes first master device 111b, first slave device 112b, second master device 113a, and second slave device 114a. First master device 111b is provided on one coupling surface 115b of two coupling surfaces 116a, 115b facing each other between two cars 110a, 110b, and operates as a master device. First slave device 112b is provided on one coupling surface 115b and operates as a slave device. Second master device 113a is provided on other coupling surface 115b of two coupling surfaces 116a, 115b, and operates as a master device. Second slave device 114a is provided on other coupling surface 115b and operates as a slave device. First master device 111b and second slave device 114a are disposed to face each other and first slave device 112b and second master device 113a are disposed to face each other. When no wireless connections are established among first master device 111b, second master device 113a, first slave device 112b, and second slave device 114a, first master device 111b, second master device 113a, first slave device 112b, and second slave device 114a respectively switch the communication channels to be used for wireless communication between the devices.

In this configuration, each of first master device 111b, second master device 113a, first slave device 112b, and second slave device 114b switches the communication channel when no wireless connection is established with the device on the opposite side. Therefore, a wireless connection with the device on the opposite side is established. One coupling surface 116a is provided with master device 113a and slave device 114a, and other coupling surface 115b is provided with master device 111b and slave device 112b. This configuration reduces or prevents erroneous connection in which a wireless connection is established between a master device and a slave device not supporting each other or interfering of radio wave from adjacent master device or slave device. Therefore, an adequate wireless connection is established.

In the present exemplary embodiment, one of first master device 111b and first slave device 112b performs wireless communication by using a communication channel different from a communication channel used by the other one of first master device 111b and first slave device 112b for wireless communication. One of second master device 113a and second slave device 114a performs wireless communication by using a communication channel different from a communication channel used by the other one of second master device 113a and second slave device 114a for wireless communication.

In this configuration, since different communication channels are used in adjacent radio routes, occurrence of interference or erroneous connection between adjacent radio routes is effectively reduced.

In the present exemplary embodiment, first master device 111b and second slave device 114a are wirelessly connected to each other. First slave device 112b and second master device 113a are wirelessly connected to each other.

In this configuration, since a wireless connection is performed between devices facing each other, a wireless connection is easily established.

In the present exemplary embodiment, first master device 111b and first slave device 112b are disposed at positions different in the horizontal direction. Second master device 113a and second slave device 114a are disposed at positions different in the horizontal direction.

Accordingly, when two cars 110a, 110b are to be coupled, even when one car 110b is coupled to other car 110a in a state in which the front and rear of the one car 110b are reversed, a master device disposed on one car 110b and a slave device disposed on the other car can face each other. Therefore, establishment of wireless connection is easily achieved by switching the communication channel, for example.

In the present exemplary embodiment, each of first master device 111b, second master device 113a, first slave device 112b, and second slave device 114a switches the communication channel periodically. The switching cycle of the communication channel is a randomly set period.

In this configuration, when no wireless connection is established between the master device and the slave device disposed to face each other, each of the master devices and the slave devices switches the communication channel at every randomly set switching cycle T3. This configuration reduces a state in which no wireless connection is established and thus the master device and the slave device disposed to face each other continuously switch the communication channels simultaneously. Accordingly, one of the master device and the slave device switches the communication channel and thus can easily be adapted to the communication channel of the other one of the master device and the slave device.

Second Exemplary Embodiment

A second exemplary embodiment will now be described with reference to FIGS. 7 and 8. Train communication system 100 of the first exemplary embodiment is configured to shift the mode to the channel switching mode when no wireless connection is established. However, train communication system 100 is not limited thereto and may be configured to shift the mode to a master device or slave device switching mode. In the following description, the same components as train communication system 100 according to the first exemplary embodiment are allocated to the same reference signs, and description will be omitted.

[2-2. Operation]

An operation will be described below. Train communication system 100 of the present exemplary embodiment is operated by switching the mode between the normal mode and the master device or slave device switching mode.

Figure 7:
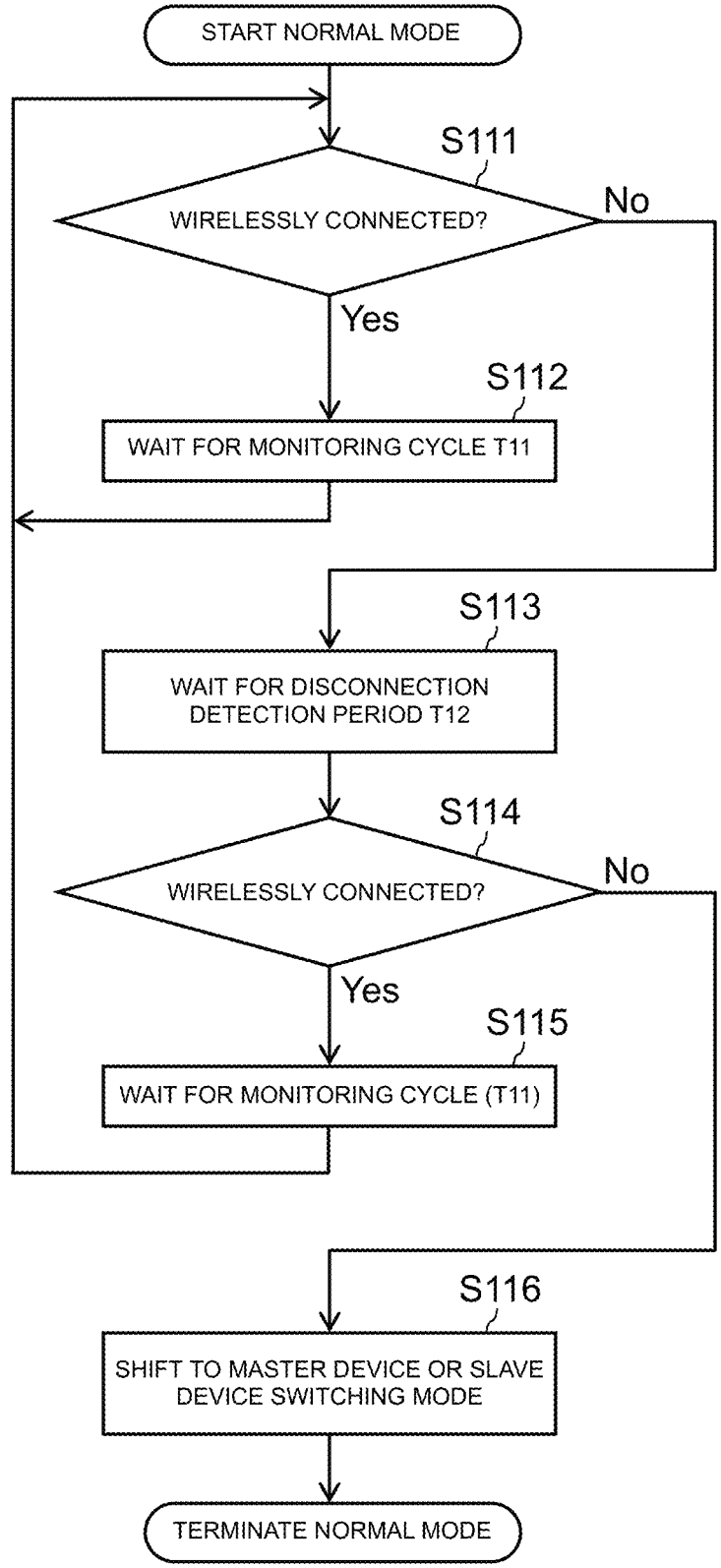
FIG. 7 is a flowchart illustrating an operation when each device according to a second exemplary embodiment is in the normal mode.

FIG. 7 is a flowchart illustrating an operation when each device according to the second exemplary embodiment is in the normal mode. FIG. 8 is a flowchart illustrating an operation when each device according to the second exemplary embodiment is in a channel switching mode.

In train communication system 100 of the present exemplary embodiment, each of first master devices 111a, 111b, . . . , first slave devices 112a, 112b, . . . , second master devices 113a, 113b, . . . , and second slave devices 114a, 114b, . . . operates independently. Therefore, only an operation of second master device 113a will be described below. The similar operation is performed also in other devices.

The normal mode will be described with reference to FIG. 7.

In the normal mode, whether second master device 113a is wirelessly connected or not is determined (step S111).

When second master device 113a is determined to be wirelessly connected (Yes in step S111), second master device 113a waits for a period of monitoring cycle T11 (step S112) and repeats step S111. Monitoring cycle T11 is, for example, a period ranging from several hundred milliseconds to several seconds.

On the other hand, when second master device 113a is determined not to be wirelessly connected (No in step S111), second master device 113a waits for disconnection detection period T12 (step S113). Disconnection detection period T12 is, for example, a period ranging from several hundred milliseconds to several seconds.

Then, whether second master device 113a is wirelessly connected or not is determined again (step S114).

When second master device 113a is determined to be wirelessly connected (Yes in step S114), second master device 113a waits for a period of monitoring cycle T1 (step S115) and returns to step S111.

In this manner, the second determination of whether second master device 113a is wirelessly connected or not is performed in step S114 to exclude a state in which a wireless connection is intercepted temporarily for some reason and then is connected again in a first determination (step S111). In other words, the second determination of whether second master device 113a is wirelessly connected or not is performed to exclude a state other than the state in which the wireless connection is continuously intercepted. The number of times of determination may be three times or more.

On the other hand, when second master device 113a is determined not to be wirelessly connected (No in step S114), second master device 113a shifts to the master device or slave device switching mode (step S116) and terminates the normal mode.

Figure 8:
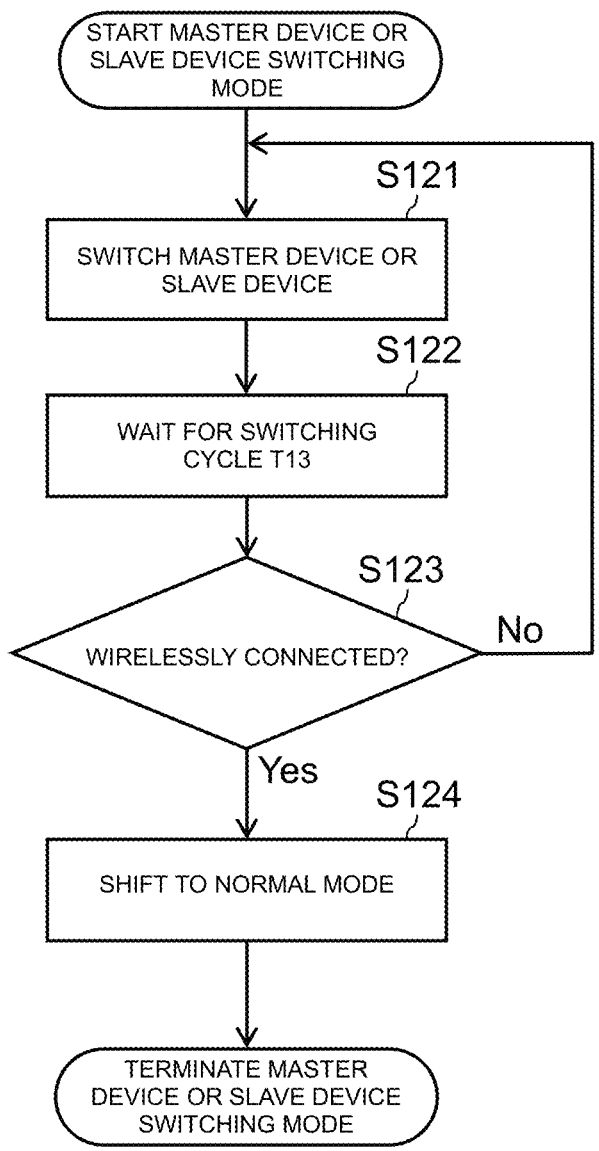
FIG. 8 is a flowchart illustrating an operation when each device according to the second exemplary embodiment is in a master device or slave device switching mode.

Referring now to FIG. 8, the master device or slave device switching mode will be described below.

In the master device or slave device switching mode, second master device 113a firstly switches the device from a current master device to a slave device (step S121). Second master device 113a is switched to, for example, second slave device 114a.

Second master device 113a switched to second slave device 114a then waits for a switching cycle T13 (step S122). The switching cycle T13 is a randomly different period. The switching cycle T13 may be, for example, a period obtained by adding a randomly selected period ranging from 1 second to 5 seconds to 10 seconds (for example, 11 seconds to 15 seconds).

Then, whether second master device 113a switched to second slave device 114a is wirelessly connected or not is determined (step S123).

When second master device 113a switched to second slave device 114a is determined to be wirelessly connected (Yes in step S123), second master device 113a shifts to the normal mode (step S124), and terminates the master device or slave device switching mode.

On the other hand, when second master device 113a switched to second slave device 114a is determined not to be wirelessly connected (No in step S123), second master device 113a returns to step S121 and switches the master device or the slave device again. In other words, second master device 113a switches the master device or the slave device periodically when no wireless connection is established.

The switching cycle T13 of the master device or the slave device is a randomly set period.

[2-3. Effect and the Like]

As described thus far, in the present exemplary embodiment, train communication system 100 is a system for performing wireless communication between two cars 110a, 110b coupled to each other by using low power radio. Train communication system 100 includes first master device 111b, first slave device 112b, second master device 113a, and second slave device 114a. First master device 111b is provided on one coupling surface 115b of two coupling surfaces 116a, 115b facing each other between two cars 110a, 110b, and operates as a master device. First slave device 112b is provided on one coupling surface 115b and operates as a slave device. Second master device 113a is provided on other coupling surface 115b of two coupling surfaces 116a, 115b, and operates as a master device. Second slave device 114a is provided on other coupling surface 115b and operates as a slave device. First master device 111b and second slave device 114a are disposed to face each other and first slave device 112b and second master device 113a are disposed to face each other. Each of first master device 111b, second master device 113a, first slave device 112b, and second slave device 114a switches between the master device and the slave device to be used for wireless communication between the devices when no wireless connections are established.

In this configuration, each first master device 111b, second master device 113a, first slave device 112b, and second slave device 114b switches between the master device and the slave device when no wireless connection is established with the device on the opposite side. Therefore, a wireless connection with the device on the opposite side is established. One coupling surface 116a is provided with master device 113a, slave device 114a, and other coupling surface 115b is provided with master device 111b, slave device 112b. This configuration reduces or prevents establishment of erroneous connection between the master device and the slave device not supporting each other or interfering of radio wave from adjacent master device or slave device. Therefore, an adequate wireless connection is established.

Third Exemplary Embodiment

A third exemplary embodiment will now be described with reference to FIGS. 9 to 11. Train communication system 100 according to the above-described exemplary embodiments is configured to operate each of first master device 111a, first slave device 112a, second master device 113a, and second slave device 114a independently. However, train communication system 100 is not limited thereto and may operate these devices in cooperation with each other. In the third exemplary embodiment, a description will be given of a train communication system in which first master device 111a, first slave device 112a, second master device 113a, and second slave device 114a operate in cooperation with each other.

[3-1. Configuration]

Figure 9:
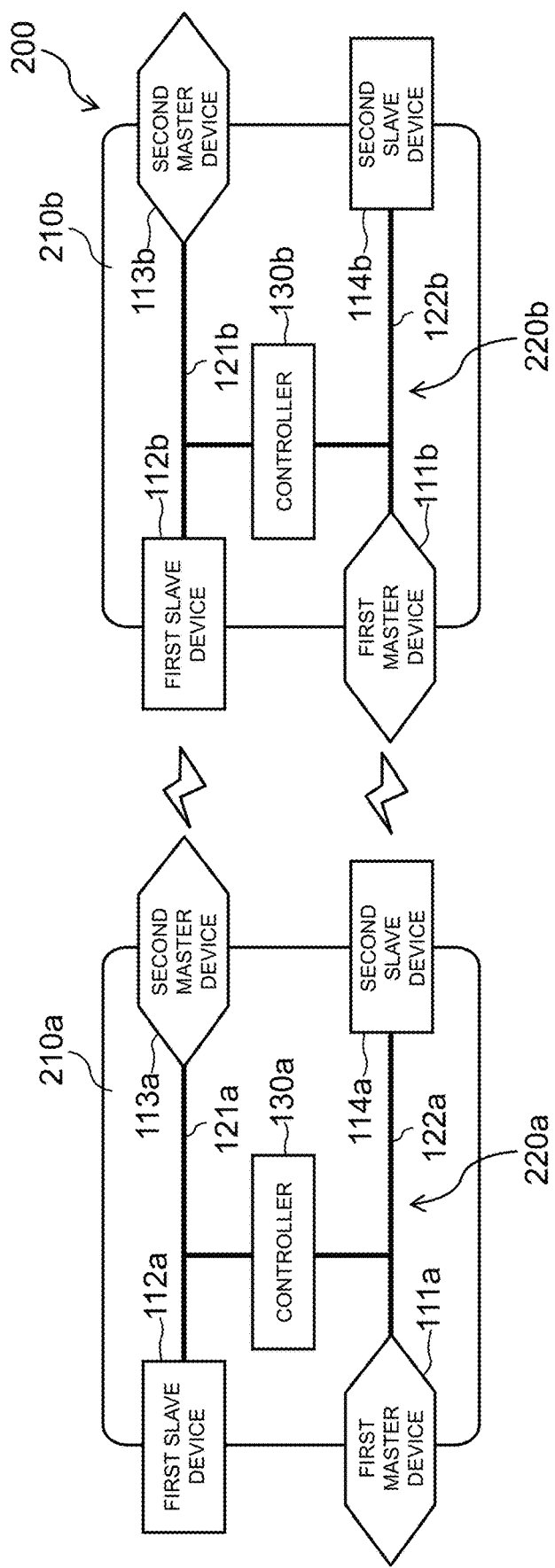
FIG. 9 is a block diagram illustrating an example of a configuration of the train communication system according to a third exemplary embodiment.

FIG. 9 is a block diagram illustrating an example of a configuration of the train communication system according to the third exemplary embodiment.

Train communication system 200 according to the third exemplary embodiment is different from train communication system 100 according to the first exemplary embodiment in that respective on-board networks 220a, 220b of cars 210a, 210b further include controllers 130a, 130b, respectively. Description of other configurations of train communication system 200 according to the third exemplary embodiment, being the same as train communication system 100 according to the first exemplary embodiment will be omitted by allocating the same reference signs. Description of controller 130b, having the same configuration as controller 130a, will also be omitted.

Controller 130a is connected to first master device 111a, first slave device 112a, second master device 113a, and second slave device 114a, and determines a communicating state of wireless communication among devices 111a to 114a, and controls the communicating state. Specifically, controller 130a determines whether each of devices 111a to 114a is wirelessly connected with the devices disposed in other cars or not. Controller 130a then controls the communicating state of each of devices 111a to 114a by storing a result of determination in the memory. Controller 130a also controls switching of communication channels of first master device 111a, first slave device 112a, second master device 113a, and second slave device 114a. Controller 130a is implemented, for example, by a processor, a memory, and a communication interface (I/F).

In train communication system 200 of the present exemplary embodiment, controller 130a controls operations of first master device 111a, first slave device 112a, second master device 113a, and second slave device 114a, and controller 130b controls operations of first master device 111b, first slave device 112b, second master device 113b, and second slave device 114b.

When car 210a and car 210b are wirelessly connected to each other, controller 130a operates as a main controller and controller 130b operates as a sub-controller. In this case, controller 130a controls controller 130b and thus controls each of devices 111b to 114b that controller 130b controls. At this time, controller 130a acquires information indicating whether each of devices 111a to 114b including devices 111b to 114b of controller 130b is wirelessly connected or not, and based on the information, registers devices disposed at a front end and devices disposed at a rear end. In the case of an train configuration illustrated in FIG. 9, the term "front end" of the train configuration means a front end of car 210a coupled to a front-most position (leading car) in the train configuration, while the term "rear end" of the train configuration means a rear end of the car coupled to the rear-most position in the train configuration.

[3-2. Operation]

A description will be given below of an operation of train communication system 200 configured as described above. Train communication system 200 of the present exemplary embodiment is operated by switching a mode between a train configuration channel switching mode and a train configuration disconnection check mode as needed.

Figure 10:
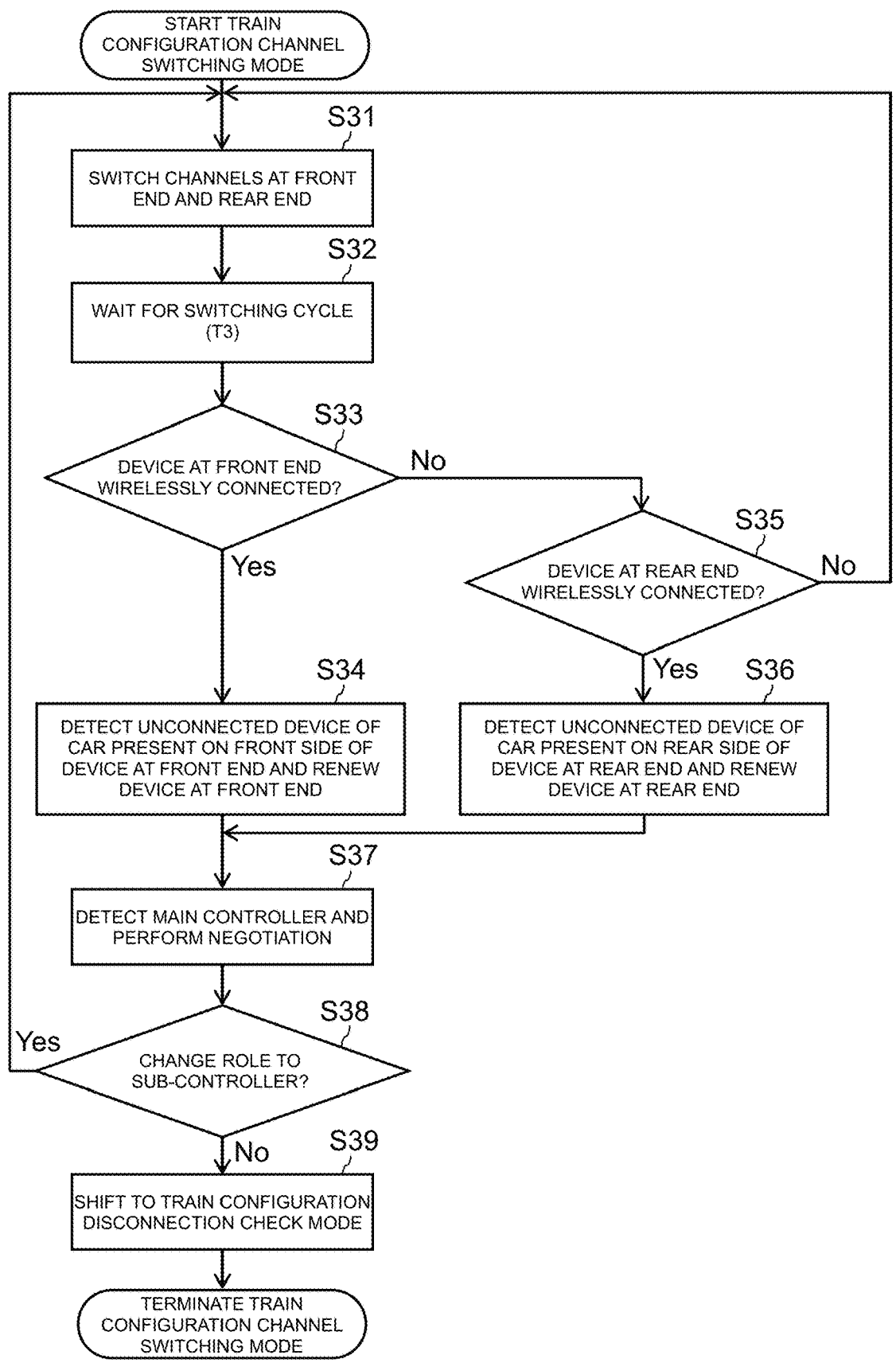
FIG. 10 is a flowchart illustrating a case where a controller according to the third exemplary embodiment operates each device in a train configuration channel switching mode.

FIG. 10 is a flowchart illustrating a case where a controller according to the third exemplary embodiment operates each device in a train configuration channel switching mode. FIG. 11 is a flowchart illustrating a case where a controller according to the third exemplary embodiment operates each device in a train configuration disconnection check mode.

Referring now to FIG. 10, the train configuration channel switching mode will be described below.

In the train configuration channel switching mode, first of all, controller 130a switches the communication channels of the devices disposed at the front end and the rear end in the train configuration including a plurality of cars 210a, 210b, . . . (step S31).

Controller 130a then waits for a switching cycle T3 (step S32). Switching cycle T3 is the same as switching cycle T3 described in the first exemplary embodiment.

Controller 130a then determines whether devices (master device and slave device) disposed at the front end of the train configuration are wirelessly connected or not (step S33).

When controller 130a determines that devices disposed on the front end of the train configuration are wirelessly connected (Yes in step S33), controller 130a detects unconnected devices (master devices and slave devices) of cars (precedent cars) present on the front side of the front end of the train configuration, and re-registers the detected devices as a device already having registered, which is a device disposed at the front end (step S34). In other words, controller 130a determines that a new car is coupled to the front side of the train configuration from a result of determination in step S33, and detects a device disposed at the front end of the newly coupled car.

On the other hand, when controller 130a determines that the device disposed at the front end of the train configuration is not wirelessly connected (No in step S33), controller 130a determines whether the device (master device and slave device) disposed at a rear end of the train configuration is wirelessly connected or not (step S35).

When controller 130a determines that devices disposed on the rear end of the train configuration is wirelessly connected (Yes in step S35), controller 130a detects unconnected devices (master devices and slave devices) of cars (following cars) present on the rear side of the rear end of the train configuration. Controller 130a then re-registers the detected device as a device already having registered, which is a device disposed at the rear end (step S36). In other words, controller 130a determines, based on a result of determination in step S35, that a new car is coupled to the rear side of the train configuration, and detects a device disposed at the rear end of the newly coupled car.

On the other hand, when the controller 130a determines that the device disposed at the rear end of the train configuration is not wirelessly connected (No in step S35), controller 130a returns to step S31.

After step S34 or step S36, controller 130a detects a controller mounted on a new car detected on the front side or the rear side of the train configuration. Controller 130a negotiates with the detected controller to determine a controller to function as a main controller (step S37). Accordingly, one of controller 130a and a detected controller functions as a main controllers and the other one of controller 130a and the detected controller functions as a sub-controller.

Each controller has a numerical value used for negotiation in advance, and in the negotiation, a controller having a smaller or larger numerical value is determined as a main controller. For example, a controller having a larger Media Access Control (MAC) address is determined as a main controller.

Controller 130a determines whether the role of controller 130a has changed to function as a sub-controller or not (step S38). When controller 130a determines that the role of controller 130a has changed to function as a sub-controller (Yes in step S38), controller 130a returns to step S31. On the other hand, when controller 130a determines that the role of controller 130a is not changed to function as a sub-controller (No in step S38), controller 130a shifts to the train configuration disconnection check mode (step S39), and terminates the train configuration channel switching mode.

Figure 11:
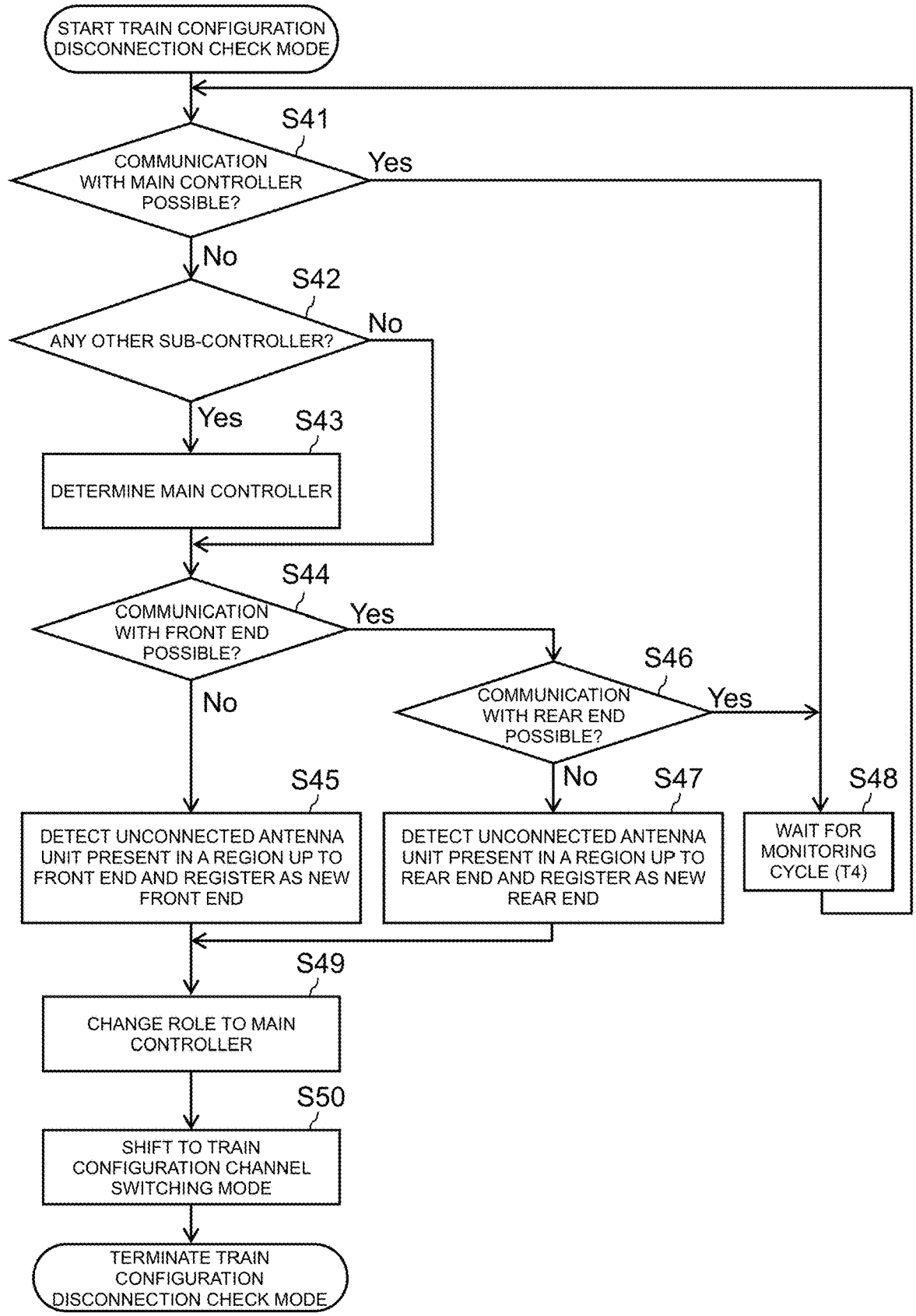
FIG. 11 is a flowchart illustrating a case where a controller according to the third exemplary embodiment operates each device in a train configuration disconnection check mode.

Referring now to FIG. 11, the train configuration disconnection check mode will be described. The train configuration disconnection check mode is an operation mode of the controller that functions as a sub-controller. A description will now be given of an example in which controller 130a functions as a main controller, and controller 130b functions as a sub-controller.

In the train configuration disconnection check mode, controller 130b determines whether communication with controller 130a that functions as a main controller is available or not (step S41).

When controller 130b determines that communication with controller 130a is not available (No in step S41), controller 130b determines whether there is any other sub-controller or not (step S42).

When controller 130b determines that there is any other sub-controller (Yes in step S42), controller 130b negotiates with other sub-controllers to determine a controller that functions as a main controller (step S43). In this case, the controller determined as a main controller functions as a temporary main controller until the role is changed. A description will be given below regarding the assumption that controller 130b is determined as a main controller after step S43.

After step S43 or when controller 130b determines that there is no other sub-controller (No in S42), controller 130b determines whether communication with devices (master device and slave device) disposed on the front end of the train configuration is available or not (step S44).

When controller 130b determines that communication with devices disposed on the front end of the train configuration is not available (No in step S44), controller 130b detects unconnected devices (master devices and slave devices) present on the front side of the front end of the train configuration, and re-registers the detected devices as a device disposed at the front end (step S45). In other words, in this case, controller 130b determines, based on a result of determination in step S44, that the car that has constituted the train configuration is decoupled on the front side of car 210b, and detects a device disposed at the front end of the train configuration including car 210b.

On the other hand, when controller 130b determines that communication with the device disposed at the front end of the train configuration is available (Yes in step S44), controller 130b determines whether communication with the devices (master device and slave device) disposed at the rear end of the train configuration is available or not (step S46).

When controller 130b determines that communication with devices disposed on the rear end of the train configuration is not available (No in step S46), controller 130b detects unconnected devices (master devices and slave devices) present on the rear side of the rear end of the train configuration, and re-registers the detected devices as a device already having registered, which is a device disposed at the rear end (S47). In other words, in this case, controller 130b determines, based on a result of determination in step S46, that the car that has constituted the train configuration is decoupled on the rear side of car 210b, and detects a device disposed at the rear end of the train configuration including car 210b.

Controller 130b waits for a period of monitoring cycle T4 (step S48) when the result of determination in step S41 is Yes, or when the result of determination in step S46 is Yes, and returns to step S41. Monitoring cycle T4 is, for example, a period ranging from several hundred milliseconds to several seconds. Note that controller 130b in this case returns from the temporary main controller to a sub-controller, and controller 130a functioning originally as a main controller continues to function as a main controller.

Controller 130b changes the role to function as a main controller after step S45 or step S47 (step S49).

Controller 130b then shifts to the train configuration channel switching mode (step S50) and terminates the train configuration disconnection check mode.

Note that, in the present exemplary embodiment, controller 130a has a configuration that controls switching of the communication channels of first master device 111a, first slave device 112a, second master device 113a, and second slave device 114a, but controller 130a is not limited thereto. Controller 130a may also be configured to control switching between the master device and the slave device in first master device 111a, first slave device 112a, second master device 113a, and second slave device 114a.

[4-1. First Modification]

Train communication system 100 of the first exemplary embodiment described above may also be applied when train configuration A including a plurality of cars and train configuration B including a plurality of other cars are coupled. In this case, in train communication system 100, when a wireless connection is established by switching the communication channels for achieving a wireless connection between the train configurations, the cars having devices that have switched the communication channels have different communication channels in the same communication route. When the communication channels are different in the same communication route, devices are easily subject to interference from outside or interference from other devices disposed in the same train configuration. Therefore, the same communication channel is preferably used in the same communication route. Therefore, when the wireless connection between the train configurations is achieved by switching the communication channels, a process of unifying the communication channels to be used in the same communication route may be performed through an operation described below.

Figure 12:
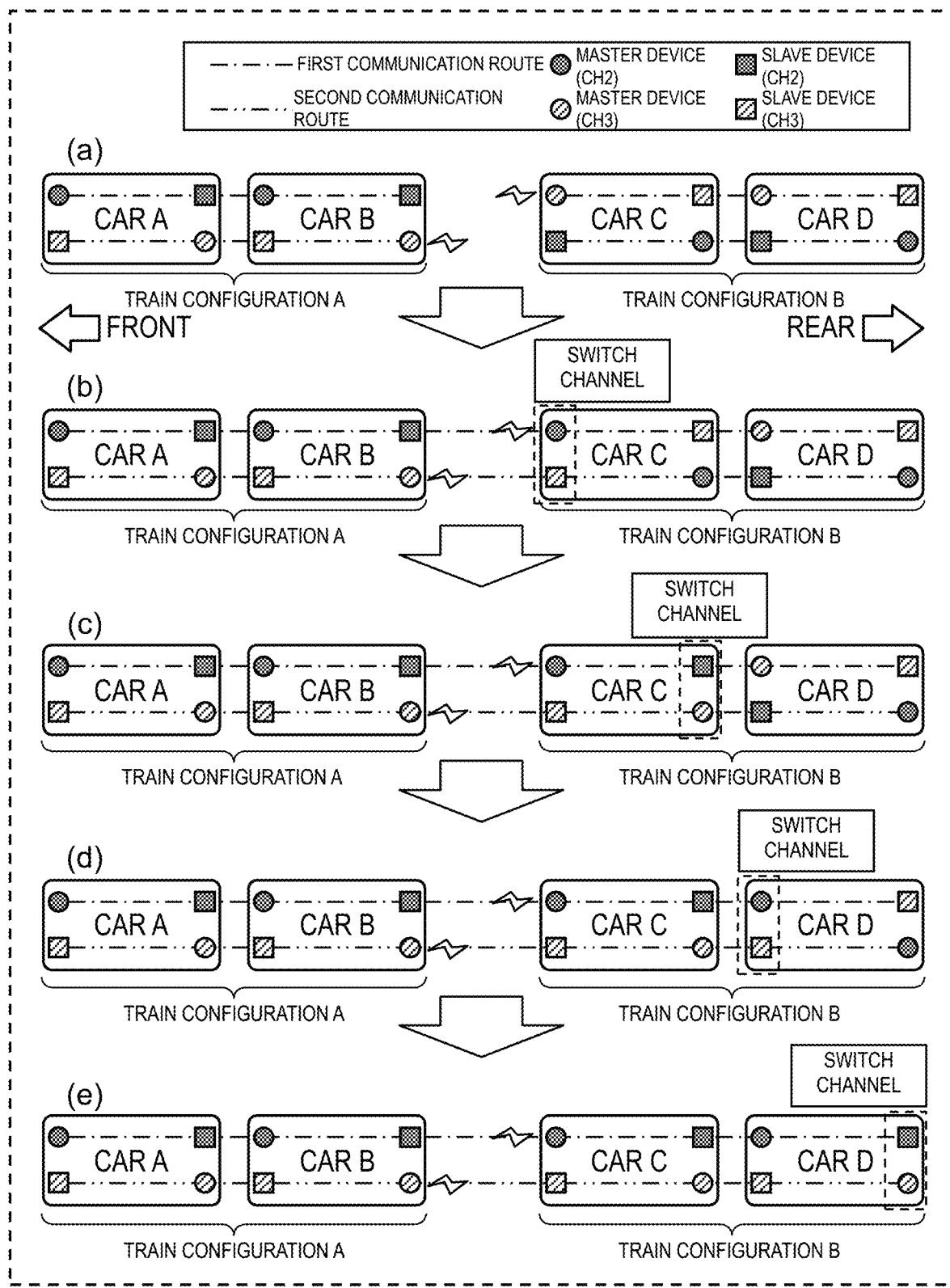
FIG. 12 is an explanatory diagram illustrating a process of unifying communication channels according to a first modification.

FIG. 12 is an explanatory diagram illustrating a process of unifying communication channels according to the first modification.

As illustrated in part (a) in FIG. 12, when no wireless connection is established even when train configuration A and train configuration B are brought closer to each other, each device performs an operation in the channel switching mode described in the first exemplary embodiment. Accordingly, as illustrated in part (b) in FIG. 12, the communication channels of the master device and the slave device at the front end of train configuration B are switched, and thus a wireless connection between train configuration A and train configuration B is established. Consequently, even when a wireless connection is established between train configuration A and train configuration B, in train configuration B, channel CH2 and channel CH3 exist in the communication channel used in a first communication route. The same applies to a communication channel used for a second communication route.

Therefore, as illustrated in (c) in FIG. 12, communication channels are switched on the master device and the slave device disposed on the rear side opposite to the front end where the master device and the slave device that have switched the communication channel are disposed. In other words, when communication is established after the switching of the communication channel, each of a first master device, a second master device, a first slave device, and a second slave device switches communication channels of a first master device, a second master device, a first slave device, or a second slave device provided on the other coupling surface of the same car.

At the next timing, as illustrated in part (d) of FIG. 12, communication channels of devices in the wireless connection between car C and car D of train configuration B are thus switched to different communication channels, and therefore the wireless connection between car C and car D is disconnected. Therefore, the master device and the slave device disposed on the front end of the car D establish wireless connections with a master device and a slave device disposed on a rear end of car C by switching the communication channels through an operation in the channel switching mode described in the first exemplary embodiment. Note that, in this case, the communication channels of the master device and the slave device at the rear end of car C have already switched in part (c) in FIG. 12, and thus the master device and the slave device of car C wait for a predetermined period without switching the communication channels until a wireless connection is established.

Then, as illustrated in part (e) in FIG. 12, the operation on car C described with reference to part (c) in FIG. 12 is performed on car D. Consequently, the communication channel to be used in the first communication route may be unified to channel CH2, and the communication channel to be used in the second communication route may be unified to channel CH3.

Note that when three or more train configurations are present, the processes in parts (d) and (e) in FIG. 12 are repeated by respective devices disposed on the following car.

For unifying the first communication route and the second communication route, the communication channel on the left side when facing upbound of the rail may be determined as a first communication channel (for example, channel CH2), and the communication channel on the right side may be determined as a second communication channel (for example, channel CH3) irrespective of the direction of travel of the train configuration including the train configuration A and the train configuration B. In this case, assuming that information for specifying the left side or the right side when facing upbound is acquired from outside, these train configurations may be configured to allocate the communication channels based on the information.

[4-2. Second Modification]

Train communication system 200 according to the second exemplary embodiment may be applied to a case of coupling train configuration A and train configuration B in the same manner as the first modification. In this case, in the same manner as the first modification, a process of unifying the communication channel to be used in the same communication route may be performed.

Figure 13:
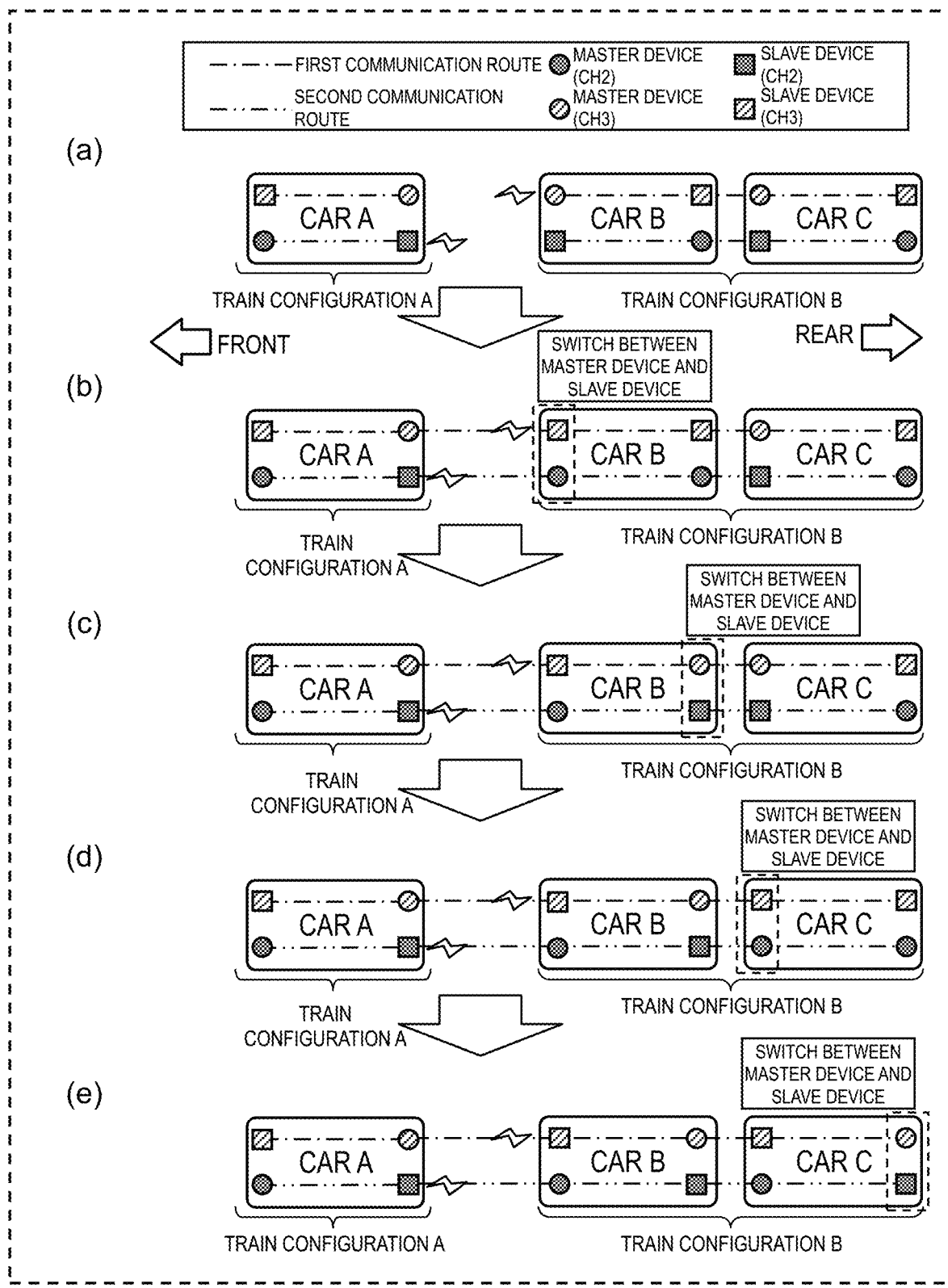
FIG. 13 is an explanatory diagram illustrating a process of unifying communication channels according to a second modification.

FIG. 13 is an explanatory diagram illustrating a process of unifying communication channels according to the second modification.

As illustrated in part (a) in FIG. 13, when no wireless connection is established even when train configuration A and train configuration B are brought closer to each other, each device performs an operation in the master device or slave device switching mode described in the second exemplary embodiment. Accordingly, as illustrated in part (b) in FIG. 13, each of the devices of the master device and the slave device at the front end of train configuration B is switched, and thus a wireless connection is established between train configuration A and train configuration B. Consequently, even when the wireless connection is established between train configuration A and train configuration B, the slave devices used in the first communication route overlap and the master devices used in the second communication route also overlap in train configuration B.

Therefore, as illustrated in (c) in FIG. 13, each of a master device and a slave device disposed at the rear end opposite to a front end where the master device and the slave device after being subject to the master-slave switching are disposed is switched. In other words, when communication are established among the first master device, the second master device, the first slave device, and the second slave device after the switching of the devices, each of the first master device, the second master device, the second master device, and the second slave device disposed on the other coupling surface of the same car where the devices are disposed is switched.

At the next timing, as illustrated in part (d) of FIG. 13, the devices in the wireless connection between car B and car C of train configuration B now become the same devices, and thus the wireless connection between car B and car C is disconnected. Therefore, the master device and the slave device disposed on the front end of the car C establish a wireless connection with a master device and a slave device disposed on a rear end of car B by switching between the master device and the slave device through an operation in the master device or slave device switching mode described in the second exemplary embodiment. Note that, in this case, switching of the master device or the slave device at the rear end of car B is performed in part (c) in FIG. 13, the master device and the slave device wait for a predetermined period without performing switching of the master device or the slave device until wireless connection is established.

Then, as illustrated in part (e) in FIG. 13, the operation on car B described with reference to part (c) in FIG. 13 is performed on car B. Consequently, the master device and the slave device can face each other with the communication channel to be used in the first communication route unified to channel CH2. In the same manner, the master device and the slave device can face each other with the communication channel to be used in the second communication route unified to channel CH3.

Note that when three or more train configurations are present, the processes in parts (d) and (e) in FIG. 12 are repeated by respective devices disposed on the following car.

[4-3. Third Modification]

Train communication system 200 according to the third exemplary embodiment may be applied to a case of coupling train configuration A and train configuration B in the same manner as the first modification. In this case, in the same manner as the first modification, a process of unifying the communication channel to be used in the same communication route may be performed.

Figure 14:
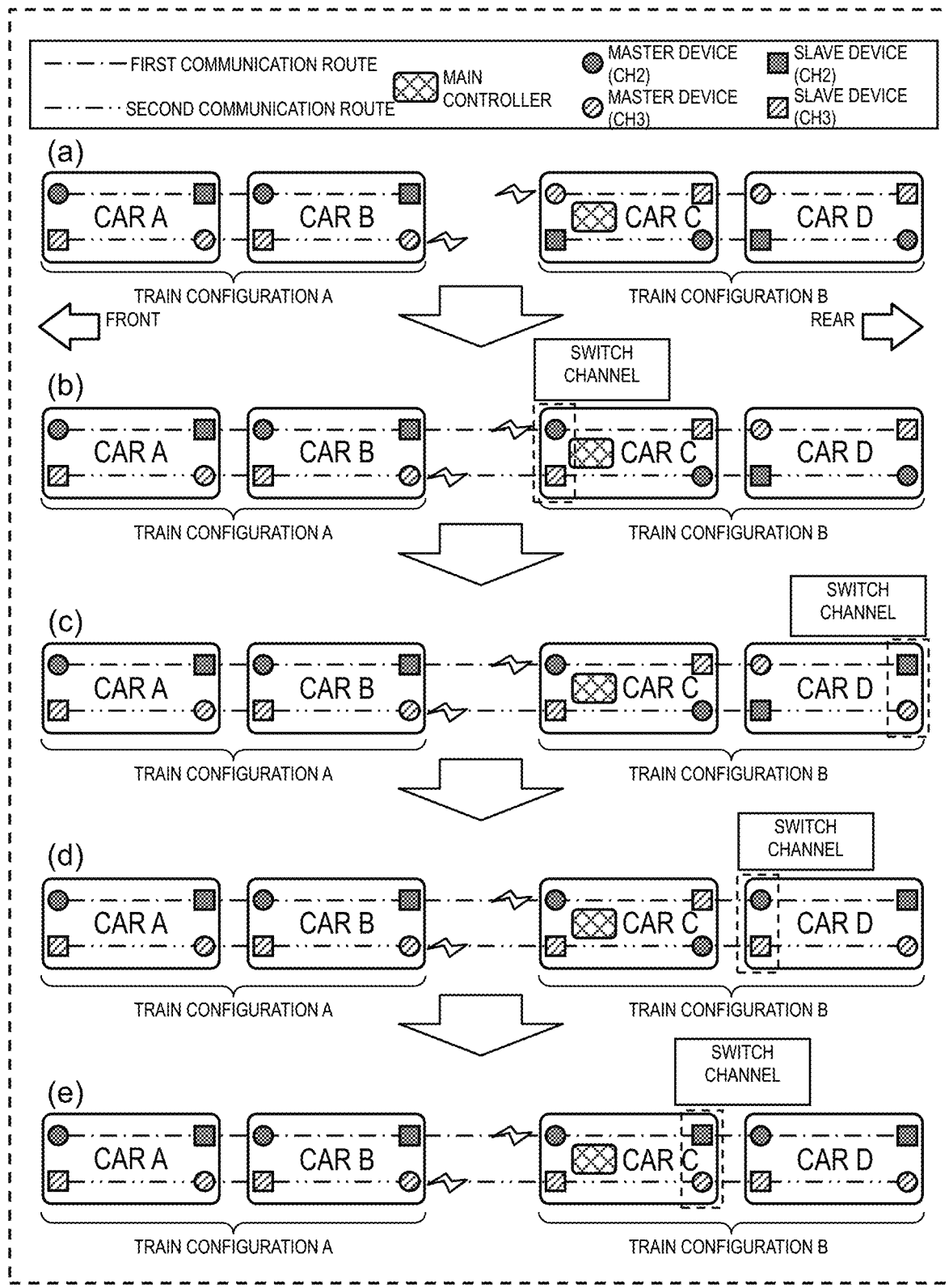
FIG. 14 is an explanatory diagram illustrating a process of unifying communication channels according to a third modification.

FIG. 14 is an explanatory diagram illustrating a process of unifying communication channels according to the third modification.

As illustrated in part (a) in FIG. 14, when no wireless connection is established even when train configuration A and train configuration B are brought closer to each other, the main controller performs control in the channel switching mode described in the third exemplary embodiment. Accordingly, as illustrated in part (b) in FIG. 14, the communication channels of the master device and the slave device at the front end of train configuration B are switched, and thus a wireless connection is established between train configuration A and train configuration B. Consequently, even when a wireless connection is established between train configuration A and train configuration B, in train configuration B, channel CH2 and channel CH3 exist in the communication channel used in a first communication route. The same applies to a communication channel used for a second communication route.

In this case, as illustrated in part (c) in FIG. 14, the main controller switches the communication channels of the master device and the slave device disposed at the rear end of train configuration B. In this manner, the reason why the communication channels of the master device and the slave device disposed at the rear end of train configuration B are switched is that the wireless connection between car C and car D is desired to be kept established as much as possible. Accordingly, the master device and the slave device disposed on a different car from the car where the main controller is disposed may be controlled by the main controller with the wireless connection maintained.

Next, as illustrated in part (d) in FIG. 14, the main controller switches the communication channels of the master device and the slave device disposed at the front end of car D.

As illustrated in part (e) in FIG. 14, the main controller then switches the communication channels of the master device and the slave device disposed at the rear end of car C where the main controller is disposed.

In other words, in the second modification, when the wireless connection with a train configuration other than the train configuration provided with the main controller is established, the main controller switches the communication channels of the master device and the slave device in the train configuration provided with the main controller on a side opposite to a side where a new wireless connection is established. Subsequently, the main controller sequentially switches the communication channels of the master device and the slave device disposed on the side where the new wireless connection with another train configuration is established.

Note that, in the present modification, the main controller switches the communication channels to establish the wireless connection, but the main controller is not limited thereto. The main controller may switch each of the master devices and the slave devices or may switch the respective devices and the communication channels simultaneously.

[4-4. Fourth Modification]

Train communication system 200 of the third exemplary embodiment may perform a process of unifying the communication channels as described in the fourth modification in addition to the third modification.

Figure 15:
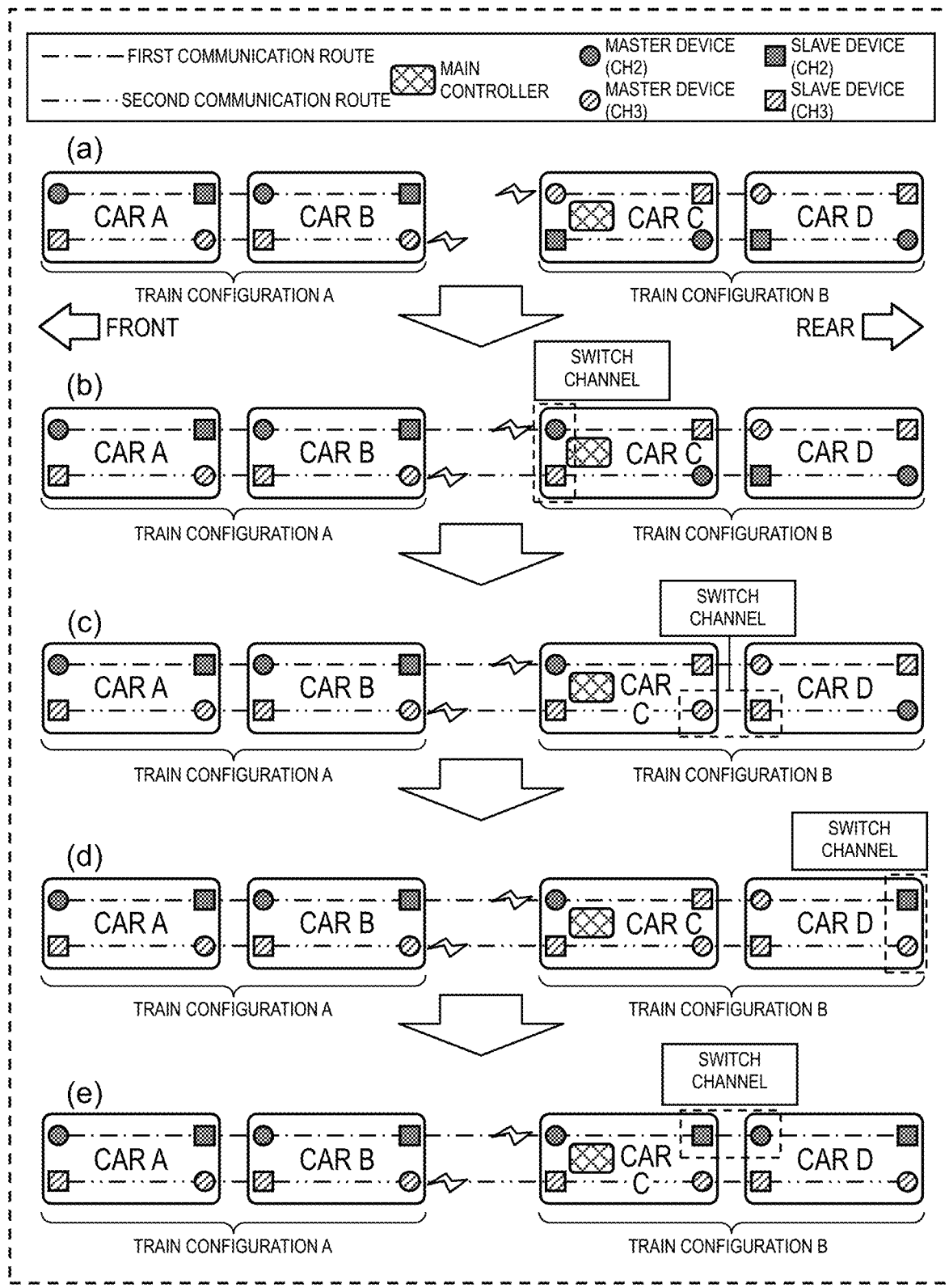
FIG. 15 is an explanatory diagram illustrating a process of unifying communication channels according to a fourth modification.

FIG. 15 is an explanatory diagram illustrating a process of unifying communication channels according to the fourth modification.

Since parts (a) and (b) of FIG. 15 are the same as parts (a) and (b) in FIG. 14, description will be omitted.

Next, as illustrated in part (c) in FIG. 15, in train configuration B, the main controller switches the communication channels of the master device and the slave device to channel CH3 to establish a wireless connection. As used herein the master device is intended to include the master device disposed at a rear end of car C where the master device and the slave device wirelessly connected newly with train configuration A are disposed and constituting the second communication route. As used herein the slave device is intended to include the slave device disposed at the front end of car D and constituting the second communication route.

As illustrated in part (d) in FIG. 15, in train configuration B, the main controller switches the communication channels of devices disposed on the rear end side of the devices that have switched the communication channels in part (c) in FIG. 15. The devices to be switched in part (d) in FIG. 15 are devices disposed at the rearmost end of train configuration B, and thus each of the communication channels of the master device and the slave device disposed at the rearmost end is switched.

Finally, as illustrated in part (e) in FIG. 15, the main controller switches the communication channel of the master device at the front end of car D and the slave device at the rear end of car C constituting the remaining first communication route.

In other words, in fourth modification, the communication channels of the devices constituting the first communication route are sequentially switched from the devices established wireless connection newly with another train configuration to the devices on the opposite side. Subsequently, the communication channels of the devices constituting the second communication route are sequentially switched from the devices on the opposite side to the devices established wireless connection newly with another train configuration.

In this manner, by switching the communication channels, a process of unifying the communication channels can be performed in a state in which the state of the main controller establishing communication among a plurality of cars constituting train configuration B is maintained.

Note that, in the present modification, the main controller switches the communication channels to establish the wireless connection, but the main controller is not limited thereto. The main controller may switch each of the master devices and the slave devices or may switch the respective devices and the communication channels simultaneously.

[4-5. Fifth Modification]

Figure 16:
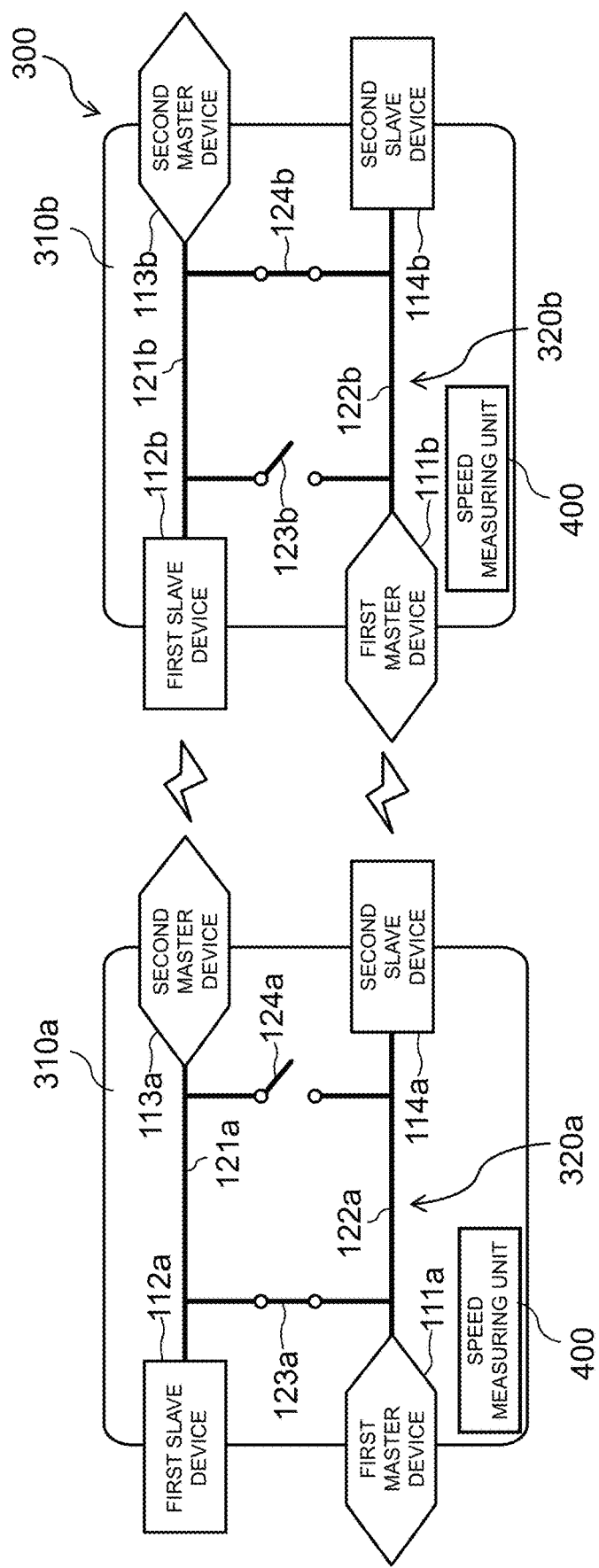
FIG. 16 is a block diagram illustrating an example of a configuration of the train communication system according to a fifth modification.

In train communication system 100 of the first exemplary embodiment described above, first on-board networks 121a, 121b constituting the first communication route and second on-board networks 122a, 122b constituting the second communication route are not connected to each other. However, as illustrated in FIG. 16, train communication system 300 may constitute a ring-shaped network by connecting first on-board networks 121a, 121b constituting the first communication route and second on-board networks 122a, 122b constituting the second communication route.

FIG. 13 is a block diagram illustrating an example of a configuration of the train communication system according to a fifth modification.

Train communication system 300 is different from train communication system 100 of the first exemplary embodiment in that on-board network 320a of car 310a includes switch 123a and switch 124a. Switch 123a is configured to be capable of connecting first on-board network 121a and second on-board network 122a on the front end side. Switch 124a is configured to be capable of connecting first on-board network 121a and second on-board network 122a on the rear end side. The same applies to the configuration of on-board network 320b of car 310b.

Therefore, in the train configuration including car 310a and car 310b, a ring-shaped network can be established easily by closing switch 123a at the frontmost end and switch 124b at rearmost end. Therefore, even when one of first communication route and second communication route is disconnected for some reason, communication of the device connected to the disconnected one of communication routes is maintained by the other communication route.

4. Other Exemplary Embodiments

Further, train communication systems 100 to 300 according to the exemplary embodiments may further include speed measuring unit 400 (see FIG. 16). Speed measuring unit 400 is provided on each of two cars and measures the speed of each car. First master device 111a, second master device 113a, first slave device 112a, and second slave device 114a may perform switching of the communication channels when the speed of the cars where these devices are disposed is equal to or lower than a predetermined value.

Generally, when the train configuration is changed, one train configuration comes in a stopped state, and the other train configuration travels at a speed lower than a traveling speed. Therefore, by switching the communication channels when the result of measurement obtained by speed measuring unit 400 is equal to or lower than the predetermined value, switching of the communication channel is not necessary at least in the traveling state. Therefore, power consumption consumed for switching the communication channels can be reduced.

In the exemplary embodiments described above, first master device 111a and a first slave device 112a are disposed at positions different in the horizontal direction at the same height from the ground, and second master device 113a and second slave device 114a are disposed at positions different in the horizontal direction at the same height from the ground. However, first master device 111a and first slave device 112a do not have to be disposed at the same height from the ground, and second master device 113a and second slave device 114a do not have to be disposed at the same height from the ground.

Specifically, each of devices 111a to 114a may be disposed as follows. In other words, first master device 111a is disposed at an upper position of coupling surface 115a at the front end in an orientation facing forward and obliquely downward in the direction of travel. First slave device 112a is disposed at a lower position of coupling surface 115a at the front end in an orientation facing forward and obliquely upward in the direction of travel. Second master device 113a is disposed at an upper position of coupling surface 116a at the rear end in an orientation facing forward and obliquely downward in the direction of travel. Second slave device 114a is disposed at a lower portion of coupling surface 116a at the rear end in an orientation facing forward and obliquely upward in the direction of travel. In this case, the same applies to car 110b. The devices are disposed in a predetermined orientation at respective positions on coupling surfaces such that second master device 113a and first slave device 112b face each other in an inclined orientation and second slave device 114a and first master device 111b face each other in an inclined orientation. The master device is disposed in an orientation facing obliquely downward, and the slave devices are disposed in an orientation facing obliquely upward in the description given thus far. However, the present invention is not limited thereto and thus a configuration is also applicable in which the master device is disposed in an orientation facing obliquely upward and the slave device is disposed in an orientation facing obliquely downward.

The communication channels used for wireless communication in first on-board network 121a and second on-board network 122a are different from each other in the above-described exemplary embodiments. However, the present invention is not limited thereto. At least the communication channels used by the master device and the slave device, disposed on the same coupling surface, for the wireless communication need to be different, and the communication channels used by devices connected by the same on-board network for wireless communication do not have to be the same.

Switching the two communication channels for use has been described in the embodiment given above. However, three or more communication channels may be switched for use as well.

As described above, the exemplary embodiments have been described as examples of the technique according to the present disclosure. For that purpose, the accompanying drawings and the detailed description are provided.

Therefore, in order to exemplify the above technique, the components described in the accompanying drawings and the detailed description not only include the components necessary to solve the problem but also can include components unnecessary to solve the problem. Thus, it should not be immediately deemed that, merely based on the fact that the components that are not essential are shown in the accompanying drawings and described in the detailed descriptions, the components that are not essential are essential.

In addition, because the above exemplary embodiments are for exemplifying the technique in the present disclosure, various modifications, replacements, additions, removals, or the like can be made without departing from the scope of the accompanying claims or the equivalent thereof.

INDUSTRIAL APPLICABILITY

The present disclosure is applicable to a train communication system capable of establishing an adequate wireless connection.

REFERENCE MARKS IN THE DRAWINGS 100, 200, 300: train communication system
101: train
110a, 110b, 210a, 210b, 310a, 310b: car
111a, 111b: first master device
112a, 112b: first slave device
113a, 113b: second master device
114a, 114b: second slave device
115a, 115b, 116a, 116b: coupling surface
120a, 120b: on-board network
121a, 121b: first on-board network
122a, 122b: second on-board network
123a, 123b, 124a, 124b: switch
130a, 130b: controller
150: coupler
400: speed measuring unit
T1: monitoring cycle
T2: disconnection detection period
T3: switching cycle
T4: monitoring cycle
d1: distance

The invention claimed is:

1. A train communication system configured to perform a wireless communication between two cars coupled to each other by using low power radio, the train communication system comprising:
a first device disposed on one coupling surface of two coupling surfaces facing each other between the two cars;
a second device disposed on the one coupling surface;
a third device disposed on another coupling surface of the two coupling surfaces; and
a fourth device disposed on the other coupling surface, wherein
the first device and the third device are disposed to face each other,
the second device and the fourth device are disposed to face each other,
when no wireless connections are established among the first device, the second device, the third device, and the fourth device, the first to fourth devices each perform at least one of switching of communication channels used for the wireless communication among the first to fourth devices and switching of a master device or a slave device,
the first device operates as a master device, and the third device operates as a slave device,
the second device operates as a slave device, and the fourth device operates as a master device, and when different communication channels are used between the first device and the third device, or when different communication channels are used between the second device and the fourth device, one of the first device and the third device is switched to another communication channel, or one of the second device and the fourth device is switched to another communication channel.

2. The train communication system according to claim 1, wherein
when no wireless connection is established between the first device and the second device, the first device and the second device simultaneously switch communication channels used for wireless communication between the first device and the second device, and
when no wireless connection is established between the third device and the fourth device, the third device and the fourth device simultaneously switch communication channels used for wireless communication between the third device and the fourth device.

3. The train communication system according to claim 1, wherein
each of the first device, the second device, the third device, and the fourth device periodically switch the communication channel, and
a switching cycle of the communication channel is a period to be set randomly.

4. The train communication system according to claim 1, further comprising speed measuring units disposed respectively on the two cars and configured to measure a speed of the cars,
wherein each of the first device, the second device, the third device, and the fourth device switches the communication channel when a speed of the car in which the first to fourth devices are disposed is equal to or lower than a predetermined value.

5. The train communication system according to claim 1, wherein when communication is established among the first device, the second device, the third device, and the fourth device after the switching of the communication channels, each of the first device, the second device, the third device, and the fourth device switches the communication channel of the first device, the second device, the third device, or the fourth device disposed on another coupling surface of a car where the first to fourth devices are disposed.

6. A train communication system configured to perform a wireless communication between two cars coupled to each other by using low power radio, the train communication system comprising:
a first device disposed on one coupling surface of two coupling surfaces facing each other between the two cars;
a second device disposed on the one coupling surface;
a third device disposed on another coupling surface of the two coupling surfaces; and
a fourth device disposed on the other coupling surface, wherein
the first device and the third device are disposed to face each other,
the second device and the fourth device are disposed to face each other,
when no wireless connections are established among the first device, the second device, the third device, and the fourth device, the first to fourth devices each perform at least one of switching of communication channels used for the wireless communication among the first to fourth devices and switching of a master device or a slave device,
an identical communication channel is used between the first device and the third device,
an identical communication channel is used between the second device and the fourth device, and
when both of the first device and the third device are the master devices or the slave devices, or when both of the second device and the fourth device are master devices or slave devices, one of the first device and the third device is switched to the slave device or the master device, or one of the second device and the fourth device is switched to the slave device or the master device.

7. The train communication system according to claim 6, wherein
when no wireless connection is established between the first device and the second device, the first device and the second device switch both of the first device and the second device simultaneously to the slave device or the master device, and
when no wireless connection is established between the third device and the fourth device, the third device and the fourth device switch both of the third device and the fourth device simultaneously to the slave device or the master device.

8. The train communication system according to claim 6, wherein
each of the first device, the second device, the third device, and the fourth device periodically switches the master device or the slave device, and
a switching cycle of the master device or the slave device is a period to be set randomly.

9. The train communication system according to claim 6, further comprising speed measuring units disposed respectively on the two cars and configured to measure a speed of the cars,
wherein each of the first device, the second device, the third device, and the fourth device switches the master device or the slave device when a speed of the car in which the first to fourth devices are disposed is equal to or lower than a predetermined value.

10. The train communication system according to claim 6, wherein when communication is established among the first device, the second device, the third device, and the fourth device after the switching of the master device or the slave device, the first device, the second device, the third device, or the fourth device disposed on another coupling surface of a car where the first to fourth devices are disposed is switched to the master device or the slave device.

* * * * *